US012810244B2

(12) United States Patent
Shepherd et al.

(10) Patent No.: US 12,810,244 B2
(45) Date of Patent: Nov. 24, 2026

(54) SYSTEMS AND METHODS FOR ASSET TRACKING USING TWINNING AND A PROTECTION ARCHITECTURE

(71) Applicant: Wells Fargo Bank, N.A., San Francisco, CA (US)

(72) Inventors: Matthew Mullin Shepherd, Charlotte, NC (US); Nathaniel C. Eutsler, San Francisco, CA (US); Piers Varley, San Francisco, CA (US)

(73) Assignee: Wells Fargo Bank, N.A, San Francisco, CA (US)

( * ) Notice: Subject to any disclaimer, the term of this patent is extended or adjusted under 35 U.S.C. 154(b) by 16 days.

(21) Appl. No.: 18/797,146

(22) Filed: Aug. 7, 2024

(65) Prior Publication Data

US 2026/0044815 A1 Feb. 12, 2026

(51) Int. Cl.
*G06Q 10/08* (2024.01)
*G06Q 10/087* (2023.01)

(52) U.S. Cl.
CPC .................................. *G06Q 10/087* (2013.01)

(58) Field of Classification Search
CPC ............. G06Q 10/087; G06Q 2220/00; G06Q 20/389; G06F 16/27; G06N 20/00
See application file for complete search history.

(56) References Cited

U.S. PATENT DOCUMENTS

| | | | | |
|---|---|---|---|---|
| 10,534,361 | B2 * | 1/2020 | Smiley | G05B 23/0283 |
| 11,354,615 | B2 * | 6/2022 | Berti | G06Q 10/20 |
| 11,676,098 | B2 * | 6/2023 | Berti | G06F 21/6209 705/28 |
| 11,973,875 | B2 * | 4/2024 | Perkins | H04L 9/3213 |
| 12,555,096 | B2 * | 2/2026 | Pene | G06Q 20/10 |
| 12,585,282 | B2 * | 3/2026 | Cella | G05B 19/41885 |
| 12,664,505 | B2 * | 6/2026 | Cella | G06Q 10/06375 |
| 2017/0352027 | A1 * | 12/2017 | Zhang | H04L 9/0825 |
| 2019/0317935 | A1 * | 10/2019 | Berti | G06F 16/27 |
| 2023/0351347 | A1 * | 11/2023 | Damrow | G06Q 20/36 |
| 2025/0005512 | A1 * | 1/2025 | Ward | G06Q 10/08 |
| 2025/0068408 | A1 * | 2/2025 | Turlica | G06F 8/65 |
| 2025/0380285 | A1 * | 12/2025 | Regev | H04B 1/04 |
| 2026/0065102 | A1 * | 3/2026 | White | G06F 16/285 |
| 2026/0162084 | A1 * | 6/2026 | Unterberg | G06Q 20/06 |

* cited by examiner

*Primary Examiner* — Florian M Zeender
*Assistant Examiner* — Milena Racic
(74) *Attorney, Agent, or Firm* — Foley & Lardner LLP

(57) ABSTRACT

Various systems and methods are disclosed relating to twinning and/or tracking assets on-chain and off-chain. A data processing system includes one or more processing circuits configured to identify a physical asset corresponding to a tracking device and generate a digital twin of the physical asset. The one or more processing circuits are further configured to generate a token including a link to the digital twin and generate a control structure including executable code to verify a condition of the physical asset. The one or more processing circuits are further configured to broadcast the control structure to a distributed ledger and receive tracking data of the tracking device. The one or more processing circuits are further configured to broadcast the tracking data to the distributed ledger and update, using the control structure, the metadata object including the update to the metadata of the digital twin.

20 Claims, 4 Drawing Sheets

SYSTEMS AND METHODS FOR ASSET TRACKING USING TWINNING AND A PROTECTION ARCHITECTURE

TECHNICAL FIELD

The present implementations relate generally to asset management and tracking, and more particularly to systems and methods for integrating data retrieval and execution of conditions across distributed ledger technologies.

BACKGROUND

Various industries involve the management and tracking of physical assets. Ensuring the accuracy, security, and efficiency of this process can be important for effective asset tracking and protection. Traditional methods for tracking physical assets often face challenges related to data synchronization, security, and transparency. These methods cannot provide real-time updates or can face challenges in reconciling physical movements with digital records accurately. There is a need for improved systems and methods that enhance the tracking, protection, and verification of physical assets, ensuring that digital records accurately reflect the physical state of the assets, and vice-versa.

SUMMARY

Some implementations relate to a system for protecting assets. The system can include a data processing system including memory and one or more processing circuits can be configured to identify at least one physical asset corresponding to a tracking device. The one or more processing circuits can be further configured to generate a digital twin of the at least one physical asset, the digital twin including a unique identifier, and a metadata object corresponding to the at least one physical asset. In some implementations, the digital twin corresponds to a persistent representation of the at least one physical asset. The one or more processing circuits can be further configured to generate a token including a link to the digital twin. In some implementations, the token is linked to a first digital wallet. The one or more processing circuits can be further configured to generate a control structure including executable code to verify an off-chain condition of the at least one physical asset. In some implementations, the off-chain condition corresponds to tracking data of the tracking device via a communication link using the control structure. The one or more processing circuits can be further configured to broadcast the control structure to at least one distributed ledger. In some implementations, broadcasting includes generating a first record on the at least one distributed ledger for the control structure. The one or more processing circuits can be further configured to receive tracking data of the tracking device, the tracking data corresponds to an update to metadata of the at least one physical asset. The one or more processing circuits can be further configured to broadcast the tracking data to the at least one distributed ledger. The one or more processing circuits can be further configured to update, using the control structure, the metadata object including the update to the metadata of the digital twin based on the tracking data. In some implementations, updating includes verifying the update to the metadata based on a digital signature of the tracking data. In some implementations, updating includes verifying an actual state of the at least one physical asset corresponds to an expected state of the at least one physical asset based on accessing the link to the digital twin in the token. In some implementations, the update of the metadata object is responsive to verifying the actual state corresponds to the expected state.

Some implementations relate to a method for protecting assets. The method can include identifying, by one or more processing circuits, at least one physical asset corresponding to a tracking device. The method can further include generating, by the one or more processing circuits, a digital twin of the at least one physical asset, the digital twin including a unique identifier, and a metadata object corresponding to the at least one physical asset. In some implementations, the digital twin corresponds to a persistent representation of the at least one physical asset. The method can further include generating, by the one or more processing circuits, a token including a link to the digital twin. In some implementations, the token is linked to a first digital wallet. The method can further include generating, by the one or more processing circuits, a control structure including executable code to verify an off-chain condition of the at least one physical asset. In some implementations, the off-chain condition corresponds to tracking data of the tracking device via a communication link using the control structure. The method can further include broadcasting, by the one or more processing circuits, the control structure to at least one distributed ledger. In some implementations, broadcasting includes generating a first record on the at least one distributed ledger for the control structure. The method can further include receiving, by the one or more processing circuits, tracking data of the tracking device. In some implementations, the tracking data corresponds to an update to metadata of the at least one physical asset. The method can further include broadcasting, by the one or more processing circuits, the tracking data to the at least one distributed ledger. The method can further include updating, by the one or more processing circuits using the control structure, the metadata object including the update to the metadata of the digital twin based on the tracking data. In some implementations, updating includes verifying the update to the metadata based on a digital signature of the tracking data. In some implementations, updating includes verifying an actual state of the at least one physical asset corresponds to an expected state of the at least one physical asset based on accessing the link to the digital twin in the token. In some implementations, the update of the metadata object is responsive to verifying the actual state corresponds to the expected state.

Some implementations relate to a non-transitory computer readable medium (CRM) including one or more instructions stored thereon that, when executed by one or more processing circuits, cause the one or more processing circuits to perform operations including identifying at least one physical asset corresponding to a tracking device. The one or more processing circuits can perform additional operations including generating a digital twin of the at least one physical asset, the digital twin including a unique identifier, and a metadata object corresponding to the at least one physical asset. In some implementations, the digital twin corresponds to a persistent representation of the at least one physical asset. The one or more processing circuits can perform additional operations including generating a token including a link to the digital twin. In some implementations, the token is linked to a first digital wallet. The one or more processing circuits can perform additional operations including generating a control structure including executable code to verify an off-chain condition of the at least one physical asset. In some implementations, the off-chain condition corresponds to tracking data of the tracking device via a communication link using the control structure. The one or more processing circuits can perform additional operations including broadcasting the control structure to at least one distributed ledger. In some implementations, broadcasting includes generating a first record on the at least one distributed ledger for the control structure. The one or more processing circuits can perform additional operations including receiving tracking data of the tracking device. In some implementations, the tracking data corresponds to an update to metadata of the at least one physical asset. The one or more processing circuits can perform additional operations including broadcasting the tracking data to the at least one distributed ledger. The one or more processing circuits can perform additional operations including updating, using the control structure, the metadata object including the update to the metadata of the digital twin based on the tracking data. In some implementations, updating includes verifying the update to the metadata based on a digital signature of the tracking data. In some implementations, updating includes verifying an actual state of the at least one physical asset corresponds to an expected state of the at least one physical asset based on accessing the link to the digital twin in the token. In some implementations, the update of the metadata object is responsive to verifying the actual state corresponds to the expected state.

Numerous specific details are provided to impart a thorough understanding of implementations of the subject matter of the present disclosure. The described features of the subject matter of the present disclosure can be combined in any suitable manner in one or more embodiments and/or implementations. In this regard, one or more features of an aspect of the implementations can be combined with one or more features of a different aspect of the implementations. Moreover, additional features can be recognized in certain embodiments and/or implementations that cannot be present in all embodiments or implementations.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers indicate identical, functionally similar, and/or structurally similar elements.

Figure 1:
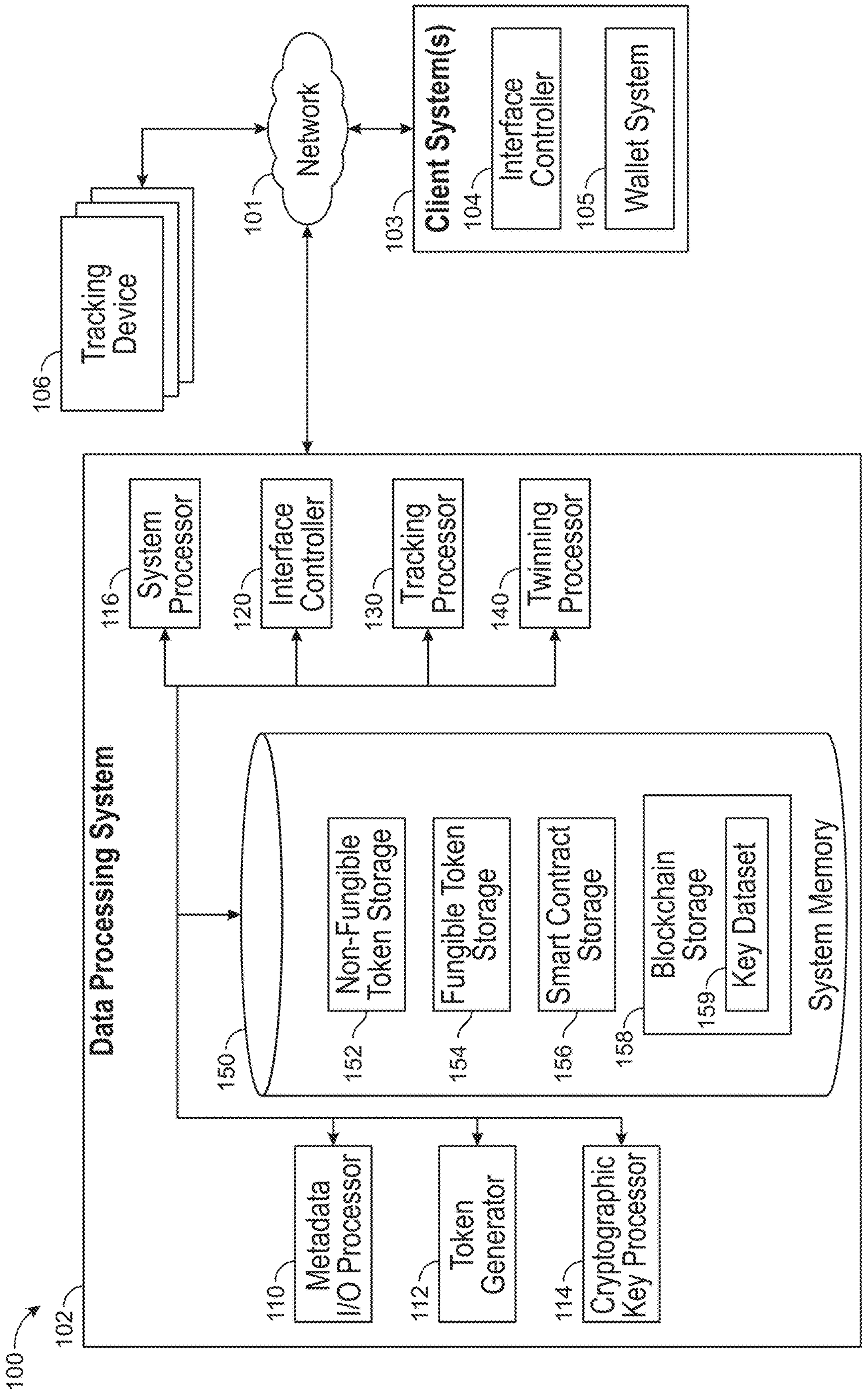
FIG. 1 depicts an example system, according to some implementations.

It will be recognized that some or all of the FIGS. are schematic representations for purposes of illustration. The FIGS. are provided for the purpose of illustrating one or more implementations with the explicit understanding that they will not be used to limited the scope of the meaning the claims.

DETAILED DESCRIPTION

The present implementations will now be described in detail with reference to the drawings, which are provided as illustrative examples of the implementations so as to enable those skilled in the art to practice the implementations and alternatives apparent to those skilled in the art. Notably, the Figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, any term in the specification or claims should not be ascribed an uncommon or special meaning unless explicitly set forth as such. Further, the present implementations encompass present and future known equivalents to the known components referred to herein by way of illustration.

The technical solution described herein relates to digital twins for tracking off-chain activities. The digital twins can reconcile physical movements of securities/assets with the blockchain (i.e., off-chain activities). The implementations can be used to track and protect off-chain activities (e.g., activities that originated off-chain or have a component that is off-chain) where such activities are intended to be duplicated on-chain. For example, a promissory note can have an RFID tag applied to it to monitor its physical movement. The tracker can send information updates to the blockchain, such as a data payload including a unique note identifier, the chain, and the location of the note. In some implementations, the chain identifier can be used by processors to identify which chain the information belongs to, facilitating automatic updates to the blockchain with the information associated with the note. Additionally, the implementations can be used to monitor on-chain activities and records the information down to the physical asset. Thus, the technical solutions described herein can improve monitoring of on-chain and off-chain activities, facilitating reconciliation between physical and digital activities involving assets.

Accordingly, the systems, computer-readable media, and methods described herein provide improvements over typical asset exchange systems and data storage and/or access systems. That is, the technical problem that arises from typical exchange systems and data systems occurs when assets and data of the assets are stored and transferred (e.g., physically or digitally) with minimal security or authorization checks. For example, when a digital asset is stored or exchanged by a user device, the digital asset itself and data stored in or on the digital asset can have been modified or changed (e.g., compromised) without the knowledge of the asset exchange system or data storage and/or access system. For example, digital assets can be vulnerable to compromise (e.g., stealing, spoofing, hacking, etc.) by hackers. Thus, to improve asset protection and data security, the technical solution is solved by obfuscating and protecting the assets (e.g., digital, physical) utilizing a digital twin that is restricted utilizing one or more particular control structures and protected utilizing blockchain ledgers and structures described herein. This not only protects assets from hackers (or third parties) by reducing or eliminating the exposure or potential for manipulation of protected or private information of assets at client systems (e.g., provider, user, goods, or service provider), but also protects entities and users from exposing their protected or private information (e.g., banking, sensitive, financial), which is a significant improvement to the security and integrity of assets and data that are exchanged and stored.

Moreover, aspects of the present disclosure address problems in the speed and resource requirement and/or allocation associated with verifying and processing digital twin exchanges, allocation segmentations, and distributions. Additionally, aspects of the present disclosure address problems in the issuance of dynamic exchange and distribution instruments that include internal states that dynamically change in real-time or near real-time. In some implementations, the systems and methods described herein can issue and dynamically update segmented allocations and digital twins. That is, since an asset's value or other financial parameters (represented and/or linked to a digital twin in metadata) or use can fluctuate often, the systems and methods described herein provide improvements over current digital twin exchange and distribution instruments by providing a physical and digital distribution and exchange instrument that can monitor and provide (e.g., present on the physical or digital exchange instrument) real-time information about the internal states of the digital twins and segmented allocations can be updated in real-time or near real-time to protect the issuer of the digital twin. Thus, aspects of the present disclosure improve the issuance and monitoring of dynamic exchange and distribution instruments linked to digital twins by offering real-time information to the holder (or someone having rights to the underlying asset) and updating segmented allocations and internal states of the digital twin in real-time or near real-time based on continuously monitoring the asset represented by the digital twin.

FIG. 1 depicts an example system, in accordance with present implementations. As illustrated by way of example in FIG. 1, an example system 100 can include at least a network 101, a data processing system 102, a client system 103, and a tracking device 106. The network 101 can include any type or form of network. The geographical scope of the network 101 can vary widely and the network 101 can include a body area network (BAN), a personal area network (PAN), a local-area network (LAN), e.g., Intranet, a metropolitan area network (MAN), a wide area network (WAN), or the Internet. The topology of the network 101 can be of any form and can include, e.g., any of the following: point-to-point, bus, star, ring, mesh, or tree. The network 101 can include an overlay network which is virtual and sits on top of one or more layers of other networks 101. The network 101 can include any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can include a type of a broadcast network, a telecommunications network, a data communication network, or a computer network.

The data processing system 102 can include at least one physical computer system operatively coupled or that can be coupled with one or more components of the system 100, either directly or directly through an intermediate computing device or system. The data processing system 102 can include at least one virtual computing system, at least one operating system, and at least one communication bus to effect communication and processing. The data processing system 102 can include a metadata I/O processor 110, token generator 112, cryptographic key processor 114, system processor 116, interface controller 120, tracking processor 130, and twinning processor 140. It should be understood that the data processing system 102 can be a provider computing system associated with a provider. The provider can be an entity responsible for managing physical assets, such as financial institutions, logistics companies, supply chain managers, or any organization needing to track physical asset movements. That is, the data processing system 102 can be managed by, owned by, or otherwise associated with such a provider entity.

Generally, the data processing system 102 can implement the creation of digital twins for tracking off-chain activities (and vice-versa tracking on-chain activities) via detection of certain conditions using tokens and tracking device 106. For example, the physical assets can be a physical instrument, physical containers, packages, financial instruments, or other movable items or assets. In operation, physical assets can be equipped with tracking devices 106, and the data processing system 102 can collect movement data based on the physical location and status of these assets. In these operations, a tracking processor 130 can monitor the status and movements of the physical asset. That is, the data processing system 102 can create a digital twin for one or more physical assets. This can create an immutable data trail. In some implementations, the data processing system 102 can actively monitor the digital twin of the physical assets using the tracking device 106. For example, there can be a plurality of digital twins representing individual physical assets. In some implementations, the data processing system 102 can receive various predefined characteristics of the physical assets, such as location, condition, ownership status, and so on from the tracking device 106 and/or other data sources (e.g., news feeds, social media feeds, messages, and other feeds). For example, regarding a promissory note, tracking data can be transmitted to the data processing system 102 when the promissory note has been moved to a specific location. If tracking data is received, the data processing system 102 can update the digital twin to reflect the current location; if not. Furthermore, tracking can be broken down into more granularity as well, such as if the promissory note is opened or closed, its temperature, or its content status. For example, as the individual physical assets are monitored, conditions of the physical assets can be identified (e.g., location changes, status updates, environmental conditions, security breaches, integrity checks, or any relevant condition). In some implementations, based on the characteristics of the individual physical assets, the data processing system 102 can update the digital twins.

Referring to the data processing system 102 generally, the data processing system 102 can implement and facilitate the creation of digital twins for tracking off-chain activities. Physical movements of securities and/or assets often cannot be tracked by the blockchain (i.e., off-chain activities). The digital twins described herein can be used to reconcile the physical movements with the blockchain. For example, this can apply to off-chain activities (e.g., activities that originated off-chain or have a component that is off-chain) where such activities are intended to be duplicated on-chain (e.g., in contrast to a pure native asset that exists only on-chain). For example, a tracker can be applied to a physical asset, such as a promissory note. The tracker can monitor the physical movement of the note and send information updates to the data processing system 102. A data payload can include a unique note identifier, the chain, and the location of the note can be transmitted to the data processing system 102 to facilitate recordation on the blockchain and/or digital twin. In some implementations, the identifier (e.g., chain) can be used by processors to identify which blockchain or location the information belongs to, facilitating automatic updates to the blockchain with information associated with the note. The data processing system 102 can also facilitate recordation on the physical asset based on on-chain activities.

The data processing system 102 can monitor and capture off-chain activities, facilitating reconciliation between physical and digital activities involving assets. The implementations can improve monitoring of on-chain and off-chain activities, facilitating reconciliation between physical and digital activities involving assets. This can ensure that any physical changes in the asset are mirrored in its digital twin on the blockchain. In some implementations, the data processing system 102 can facilitate sealing of an asset (e.g., a promissory note) in a digitized package to make it tamper-resistant while facilitate the tracking of movements of the physical asset to the chain. This can include creating a digital counterpart (e.g., digital twin) for tracking activities of physical assets that are originally off-chain, intending to replicate these activities on the blockchain. For example, the data processing system 102 can use various technologies (e.g., RFID tags) to monitor physical assets and record their movements on the blockchain, ensuring validation and tamper resistance, as well as displaying blockchain-based updates directly on the physical asset's packaging. For example, a note can refer to a physical document or asset that holds value or information, such as a promissory note, legal document, or financial instrument. The note can be digitally represented on a blockchain to track its ownership and movements, ensuring that the physical note's integrity and authenticity are maintained through digital validation and tracking mechanisms.

Still referring to the data processing system 102 generally, the data processing system 102 can provide a digital twin for tracking off-chain activities. This can apply to off-chain activities, such as those that originated off-chain or have a component that is off-chain, where such activities are intended to be duplicated on-chain. In some implementations, the data processing system 102 can create digital twins for physical assets, ensuring their movements and statuses are accurately reflected on the blockchain. In some implementations, the data processing system 102 can utilize a tracker, such as an RFID tag, to monitor the movements of a physical asset and record this activity on a blockchain. For example, a note at a custodian that has moved can have a digital representation, or token, on-chain. The possession of the digital twin, rather than the physical note itself, can represent ownership of the digital token which can equate to ownership of the note. The digital twin can be contained within a digitized envelope with hashes and/or seals.

Regarding physical-to-digital tracking and validation, the data processing system 102 can scan a physical note (e.g., using OCR or other techniques), seal it in an envelope, and apply a hash to the package. This immobilizes the note, locking it within the package and sending the information to the blockchain. In some implementations, the data processing system 102 can include a small screen on the package to display updates from the blockchain. For example, trades regarding the note on-chain can be reflected digitally on the package, allowing users to view updates. In some implementations, the data processing system 102 can link a chip on the physical asset to the blockchain using hashes. As the hashes move, the data processing system 102 can correlate them to the package using a mapping algorithm, identifying a wireless address for the package and transmitting periodic updates. This can allow a user to verify the movements recorded on the blockchain against those on the package, ensuring the validity of the asset.

The metadata input/output (I/O) processor 110 is at least one processor structured or configured to identify and generate metadata (sometimes referred to as "attributes" or "rules" or "characteristics") of one or more physical assets. For example, the metadata I/O processor 110 can identify one or more characteristics of individual physical assets. The metadata I/O processor 110 can generate a particular feature corresponding to one or more characteristics of a token or a metadata linked with the token. For example, a feature can include a scalar or vector quantity corresponding to one or more distributions of an aspect of a token. For example, a feature can include a list of coordinates corresponding to a line identified in an image linked with a token. For example, a feature can include a numeric value corresponding to an identifier of a token. For example, criteria by which physical assets can be identified can include aspects of the physical asset, fields or components of the physical asset, transform processes used to generate or modify the physical asset, aspects of a metadata object linked with the physical asset, or any combination thereof. For example, aspects of the physical asset can include a hash of the physical asset, or a value of an individual field of the physical asset. For example, aspects of a metadata object linked with the physical asset can include a bitmap of an image linked with the physical asset, or a hash of a media metadata linked with the physical asset. Media metadata can include images, audio, three-dimensional (3D) models, or any combination thereof.

The metadata I/O processor 110 is also structured or configured to generate and modify one or more metadata objects corresponding to the at least one physical asset. For example, the metadata I/O processor 110 can generate a metadata object based on the movement of the physical asset. The metadata of the metadata object can comprise ownership information, custodian information of the at least one physical asset, and historical data of the at least one physical asset. The historical data can include a plurality of previous states and a plurality of previous updates of the metadata object. The control structure can restrict (i) outputs of the metadata object and (ii) updates to the digital twin. Additionally, the metadata I/O processor 110 can generate metrics compatible with particular thresholds. The metadata I/O processor 110 can obtain or generate one or more metadata objects and communicate with one or more external systems via the network 101. The metadata I/O processor 110 can generate metadata objects that can be transmitted to a computing device, including, for example, the client system 103. The metadata I/O processor 110 can identify one or more characteristics of a metadata object. For example, the metadata I/O processor 110 can obtain and identify metadata objects of a physical asset including video, audio, text, any media, executable programs, or any combination thereof. The metadata I/O processor 110 can transmit one or more metadata objects or references or links with one or more metadata objects to the token generator 112.

The token generator 112 can be at least one processor structured or configured to generate and modify one or more tokens. The token generator 112 can execute instructions to generate or modify tokens associated with physical assets. For example, the token generator 112 can execute various processes in response to an indication from the metadata I/O processor 110 that a particular threshold for distribution has been satisfied. The token generator 112 can also execute processes in response to detecting input corresponding to a particular physical asset. For example, the token generator 112 can generate a token that includes a link to a digital twin of the physical asset. The digital twin can be a digital representation of the physical asset, including its metadata and unique identifier. The token generator 112 can include processes to read, write, generate, or modify one or more objects linked to a token associated with a physical asset. For example, the token generator 112 can generate a token by hashing the metadata object and creating a secure link to the digital twin, ensuring that any updates to the physical asset are reflected in its digital counterpart.

Additionally, the token generator 112 is structured or configured to validate one or more tokens. The token generator 112 can generate one or more tokens and compare one or more tokens to the requirements of a particular control structure. The token generator 112 can detect whether a particular token is compatible with a particular control structure by detecting whether a particular token matches a particular token characteristic associated with the control structure. For example, the token generator 112 can detect that a token is compatible with a control structure based on comparing a hash of the token with a hash included in the control structure. The token generator 112 can generate an authorization indication based on one or more determinations and can transmit the authorization indication to the system processor 116. The token generator 112 can, for example, provide a control structure or one or more metadata objects to the system processor 116 in response to the authorization indication by decrypting an encapsulation layer of the control structure. The token generator 112 can execute the control structure with the compatible tokens to retrieve a particular control structure for the smart contract or a reference to the particular control structure from the control structure storage 156.

The cryptographic key processor 114 can be at least one processor structured or configured to handle cryptographic operations related to the secure management and verification of physical and digital assets. The cryptographic key processor 114 can generate, store, and manage cryptographic keys used for various encryption and decryption processes. For example, the cryptographic key processor 114 can generate asymmetric key pairs (e.g., RSA, ECC) for secure communication between the data processing system 102 and the tracking device 106. The cryptographic key processor 114 can also manage symmetric keys (e.g., AES) for encrypting and decrypting data transmitted over the network 101. Additionally, the cryptographic key processor 114 can facilitate the creation and verification of digital signatures. For example, the processor 114 can sign a digital twin or a token using a private key, ensuring the authenticity and integrity of the digital asset. In another example, the cryptographic key processor 114 can verify a digital signature received from a tracking device 106 or a client system 103, ensuring that the data has not been tampered with and is from a trusted source.

The cryptographic key processor 114 can also manage the encryption and decryption of metadata objects generated by the metadata I/O processor 110. For instance, the cryptographic key processor 114 can encrypt the metadata object before it is linked to a digital twin or included in a token, providing an additional layer of security. Similarly, the cryptographic key processor 114 can decrypt encrypted metadata objects received from external systems or devices. Furthermore, the cryptographic key processor 114 can support secure key exchange protocols (e.g., Diffie-Hellman) to establish secure communication channels between the data processing system 102 and other networked devices. In some implementations, the cryptographic key processor 114 can integrate with the blockchain storage 158 to manage keys used in blockchain transactions. For example, the cryptographic key processor 114 can generate keys for signing blockchain transactions that record updates to the digital twin or broadcast control structures to the distributed ledger.

The system processor 116 is at least one processor structured or configured to execute one or more instructions associated with the system 100. The system processor 116 can include an electronic processor, an integrated circuit, or the like including one or more of digital logic, analog logic, digital sensors, analog sensors, communication buses, volatile memory, nonvolatile memory, and the like. The system processor 116 can include, but is not limited to, at least one microcontroller unit (MCU), microprocessor unit (MPU), central processing unit (CPU), graphics processing unit (GPU), physics processing unit (PPU), embedded controller (EC), or the like. The system processor 116 can include a memory operable to store or storing one or more instructions for operating components of the system processor 116 and operating components operably coupled to the system processor 116. The one or more instructions can include at least one of firmware, software, hardware, operating systems, embedded operating systems, and the like. The system processor 116 or the system 100 generally can include at least one communication bus controller to effect communication between the system processor 116 and the other elements of the system 100.

The interface controller 120 can communicate with one or more external systems compatible with transferring a token. The interface controller 120 can be implemented using processing circuits that can include processors and memory. Examples of such processing circuits can include microprocessors for executing software instructions, digital signal processors for managing data transmissions, and volatile or non-volatile memory units for storing operational data and token information. For example, the interface controller 120 can include an application programming interface (API) compatible with the tracking device 106 and the client system 103. The interface controller 120 can be at least one processor structured or configured to identify at least one physical asset corresponding to a tracking device 106. The physical asset can include a promissory note, mortgage deed, secured bond, loan agreement, stock certificate, financial contract, title deed, collateral document, negotiable instrument, or any physical asset related to financial transactions. The tracking device 106 can be an RFID tag, GPS tracker, Bluetooth beacon, Wi-Fi-enabled device, motion sensor, temperature sensor, humidity sensor, pressure sensor, or any sensor configured to provide tracking data.

In some implementations, the interface controller 120 can communicate with tracking devices 160 over a secure network connection (e.g., network 101), using encrypted communication channels to ensure data integrity and confidentiality. The communication can include authenticating the tracking device 106, establishing a communication session, and initiating data transfer. For example, the interface controller 120 can receive periodic data transmissions from the tracking device 106, logging movements and status updates of the physical asset. The tracking data can include updates related to asset exchange, ownership transfer, location change, condition update, or custody change. Additionally, the interface controller 120 can broadcast control structures to at least one distributed ledger, such as blockchain storage 158. Broadcasting can include generating a first record on the distributed ledger for the control structure, encoding it into a blockchain transaction. This can be done using a ledger API, blockchain protocol, smart contract language, or other suitable interfaces. Furthermore, the interface controller 120 can broadcast tracking data to the distributed ledger, creating a transaction on the blockchain storage 158.

The tracking processor 130 can be at least one processor in the data processing system 102 structured or configured to generate a control structure, such as a smart contract, to verify off-chain conditions of physical assets tracked via the tracking device 106. The tracking processor 130 can execute operations related to managing and verifying conditions associated with physical assets. This can include generating executable code to facilitate real-time tracking and management of assets. For example, the tracking processor 130 can generate a smart contract to verify the status of a promissory note based on data received from the tracking device.

In some implementations, generating a control structure can include defining rules and conditions within the smart contract. The control structure can be stored in smart contract storage 156. The tracking processor 130 can specify conditions for asset tracking and management, coding the rules for verifying the location and status of the physical asset. For example, the tracking processor 130 can generate a control structure that includes actions to be taken when specific conditions are met, such as verifying the physical location of an asset against expected data. In some implementations, the tracking processor 130 can interact with the blockchain storage 158 to log tracking data and update the digital twin of the physical asset accordingly. This can include recording and maintaining logs of all physical asset movements and condition updates, ensuring they align with the predefined rules and conditions of the smart contracts. The tracking processor 130 can also process tasks such as receiving tracking data, verifying the location and condition of physical assets, and ensuring synchronization between the physical asset and its digital twin.

The twinning processor 140 can be at least one processor in the data processing system 102 that is structured or configured to create and maintain digital twins of physical assets. The twinning processor 140 can generate digital twins by capturing the attributes and metadata of physical assets and linking them to their digital counterparts on the blockchain storage 158. That is, the twinning processor 140 can generate a digital twin of the at least one physical asset. The digital twin can include a unique identifier, and a metadata object corresponding to the at least one physical asset. For example, the digital twin can correspond to a persistent representation of the at least one physical asset. Additionally, the twinning processor 140 can ensure that any changes to the physical assets are reflected in their digital twins in real-time. The twinning processor 140 can dynamically adjust the digital twins in response to changes in metadata, conditions, and ownership status of the physical assets. The twinning processor 140 can use the blockchain storage 158 to store and update digital twins, ensuring their accuracy and consistency with the physical assets they represent.

The system memory 150 is at least one memory device or repository configured or structured to store data associated with the system 100. The system memory 150 can include one or more hardware memory devices to store binary data, digital data, or the like. The system memory 150 can include one or more electrical components, electronic components, programmable electronic components, reprogrammable electronic components, integrated circuits, semiconductor devices, flip flops, arithmetic units, or the like. The system memory 150 can include at least one of a non-volatile memory device, a solid-state memory device, a flash memory device, and a NAND memory device. The system memory 150 can include one or more addressable memory regions disposed on one or more physical memory arrays. A physical memory array can include a NAND gate array disposed on, for example, at least one of a particular semiconductor device, integrated circuit device, and printed circuit board device. The system memory 150 can include an NFT storage area/repository 152, a fungible token storage area/repository 154, a smart contract storage area/repository 156, and a blockchain storage area/repository 158 including a key dataset 159. These areas/repositories can be separate memory devices and/or electronically isolated modules/memory portions within the system memory 150.

The NFT storage 152 can store one or more NFTs (e.g., a type of token) and corresponding addresses for particular NFTs that indicate links with the corresponding NFT. The NFT storage 152 can include NFTs associated with the data processing system 102 or any component thereof, the client system 103 or any component thereof, any metadata object, or any combination thereof. The key dataset 159 can store cryptographic keys associated with the data processing system 102 or any component thereof, the client system 103 or any component thereof, any metadata object, or any combination thereof. For example, the key dataset 159 can include public-private key pairs or private keys corresponding to particular accounts, NFTs, smart contracts, devices, users, systems, or any combination thereof.

The fungible token storage 154 can store one or more fungible tokens (e.g., a type of token) and semi-fungible tokens (e.g., a type of token). The fungible token storage 154 can store corresponding addresses for particular fungible tokens that indicate links with the corresponding fungible tokens, and can store corresponding addresses for particular semi-fungible tokens that indicate links with the corresponding semi-fungible tokens. The non-fungible token storage 152 can include fungible tokens and semi-fungible tokens associated with the data processing system 102 or any component thereof, the client system 103 or any component thereof, any content object, or any combination thereof. The key dataset 159 can store cryptographic keys associated with the data processing system 102 or any component thereof, the client system 103 or any component thereof, any metadata object, or any combination thereof. For example, the key dataset 159 can include public-private key pairs or private keys corresponding to particular accounts, fungible tokens, smart contracts, devices, users, systems, or any combination thereof.

The smart contract storage 156 can store one or more smart contracts (or other control structures) and corresponding addresses for particular smart contracts that indicate links with the corresponding smart contracts. The smart contract storage 156 can also store one or more control structures and their contained metadata objects and corresponding addresses for particular control structures that indicate links with the corresponding control structures. The blockchain storage 158 can store one or more blockchains linked to one or more smart contracts, tokens, control structures, or metadata objects, by corresponding addresses for particular smart contracts, tokens, control structures, or metadata objects that indicate links with a particular blockchain.

The client system 103 can include a computing system located remotely from the data processing system 102. The client system 103 can include a wallet system 105. The wallet system 105 can include an interface to execute instructions corresponding to a particular wallet account, and to modify the structure or contents of a particular smart contract corresponding to a wallet account. For example, the mobile wallet system 105 can include a user interface to receive allocation tokens and input that indicates selections of various tokens, transactions, accounts, devices, users, or systems. For example, the user interface can include a graphical user interface (GUI) that can be presented at a display device. The display device can display at least one or more user interface presentations, and can include an electronic display. An electronic display can include, for example, a liquid crystal display (LCD), a light-emitting diode (LED) display, an organic light-emitting diode (OLED) display, or the like. The display device can receive, for example, capacitive or resistive touch input. The mobile wallet system 105 can transmit one or more instructions, tokens, keys, or any combination thereof to, from, or with the data processing system 102.

The client system 103 can be used by a third party or user with a relationship to the tracking device 106 or data processing system 102 (e.g., vendor, customer, entity, supplier, and so on) to perform various actions and/or access various types of data, some of which can be provided over network 101. The term "client" as used herein can refer to an individual (or multiple individuals) operating one or more client systems 103 and interacting with resources or data via the client system 103. The client system 103 can be used to electronically transmit data (e.g., exchange requests, parameters, tokens, receive allocation tokens or distributions, etc.) to the data processing system 102, to access websites (e.g., using a browser), the internet (e.g., using a mobile application, such as a decentralized application (dApp)), supply services, supply products, and to receive and/or transmit any other types of data (e.g., geographic location data of digital or physical assets, environment data of digital or physical assets).

The client system 103 (sometimes referred to herein as a "computing system") can be a mobile computing device, desktop computer, smartphone, tablet, smart watch, smart sensor, or any other device configured to facilitate receiving, displaying, and interacting with content (e.g., web pages, mobile applications, such as decentralized application (dApp), etc.). Client system 103 can also include an interface controller 104 for communicating data over network 101 to data processing system 102 and tracking device 106. In some implementations, each client system 103 can have a digital wallet address for exchanging (e.g., receiving or sending) fungible or non-fungible values (e.g., physical assets, physical currency, cryptocurrency, digital currency, stocks, bonds, loan, deed, etc.).

The interface controller 104 can link the client system 103 with one or more of the network 101 and the data processing system 102 by one or more communication interfaces. A communication interface can include, for example, an application programming interface ("API") compatible with a particular component of the data processing system 102 or the data processing system 102. The communication interface can provide a particular communication protocol compatible with a particular component of the data processing system 102 and a particular component of the client system 103. The interface controller 104 can be compatible with particular metadata objects, and can be compatible with particular token delivery systems corresponding to segmented allocations of tokens encapsulated within control structures. For example, the interface controller 104 can be compatible with transmission of video content, audio content, or any combination thereof. For example, the interface controller 104 can be compatible with payment processing transmissions by a protocol compatible with payment processing latency and encryption structures. The communication interface of the client system 103 can be compatible with the communication interface of the data processing system 102 to perform unidirectional or bidirectional communication between the interface controllers 104 and 120.

Figure 2:
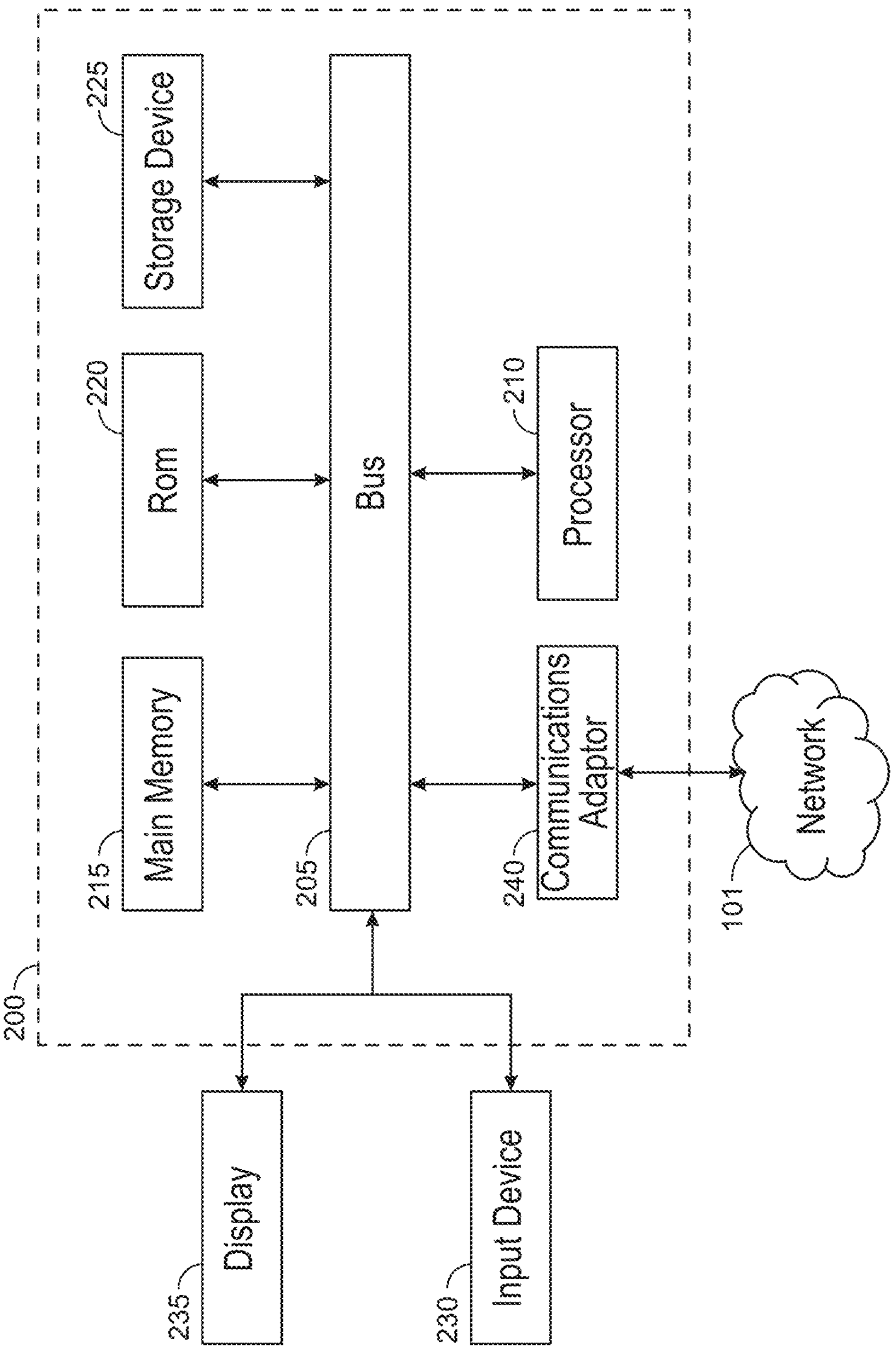
FIG. 2 depicts a block diagram illustrating an example computing system for use in the various implementations described herein.

Referring now to FIG. 2, a depiction of a computer system 200 is shown. The computer system 200 that can be used, for example, to implement a computing environment (e.g., system 100), the data processing system 102, the client systems 103, the tracking device 106, and/or various other example systems described in the present disclosure. The computing system 200 includes a bus 205 or other communication component for communicating information and a processor 210 coupled to the bus 205 for processing information. The computing system 200 also includes main memory 215, such as a random-access memory (RAM) or other dynamic storage device, coupled to the bus 205 for storing information, and instructions to be executed by the processor 210. Main memory 215 can also be used for storing position information, temporary variables, or other intermediate information during execution of instructions by the processor 210. The computing system 200 can further include a read only memory (ROM) 220 or other static storage device coupled to the bus 205 for storing static information and instructions for the processor 210. A storage device 225, such as a solid-state device, magnetic disk or optical disk, is coupled to the bus 205 for persistently storing information and instructions.

The computing system 200 can be coupled via the bus 205 to a display 235, such as a liquid crystal display, or active matrix display, for displaying information to a user. An input device 230, such as a keyboard including alphanumeric and other keys, can be coupled to the bus 205 for communicating information, and command selections to the processor 210. In another arrangement, the input device 230 has a touch screen display 235. The input device 230 can include any type of biometric sensor, a cursor control, such as a mouse, a trackball, or cursor direction keys, for communicating direction information and command selections to the processor 210 and for controlling cursor movement on the display 235.

In some implementations, the computing system 200 can include a communications adapter 240, such as a networking adapter. Communications adapter 240 can be coupled to bus 205 and can be configured to provide communications with a computing or communications network 101 and/or other computing systems. In various illustrative arrangements, any type of networking configuration can be achieved using communications adapter 240, such as wired (e.g., via Ethernet), wireless (e.g., via Wi-Fi, Bluetooth), satellite (e.g., via GPS) pre-configured, ad-hoc, LAN, WAN.

According to various arrangements, the processes that effectuate illustrative arrangements that are described herein can be achieved by the computing system 200 in response to the processor 210 executing an arrangement of instructions contained in main memory 215. Such instructions can be read into main memory 215 from another computer-readable medium, such as the storage device 225. Execution of the arrangement of instructions contained in main memory 215 causes the computing system 200 to perform the illustrative processes described herein. One or more processors in a multi-processing arrangement can also be employed to execute the instructions contained in main memory 215. In alternative arrangements, hard-wired circuitry can be used in place of or in combination with software instructions to implement illustrative arrangements. Thus, arrangements are not limited to any specific combination of hardware circuitry and software.

That is, although an example processing system has been described in FIG. 2, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 2 as singular, stand-alone devices, one of ordinary skill in the art will appreciate that, in some implementations, the computing system 200 can include virtualized systems and/or system resources. For example, in some implementations, the computing system 200 can be a virtual switch, virtual router, virtual host, virtual server. In various arrangements, computing system 200 can share physical storage, hardware, and other resources with other virtual machines. In some implementations, virtual resources of the network can include cloud computing resources such that a virtual resource can rely on distributed processing across more than one physical processor, distributed memory, etc.

Figure 3:
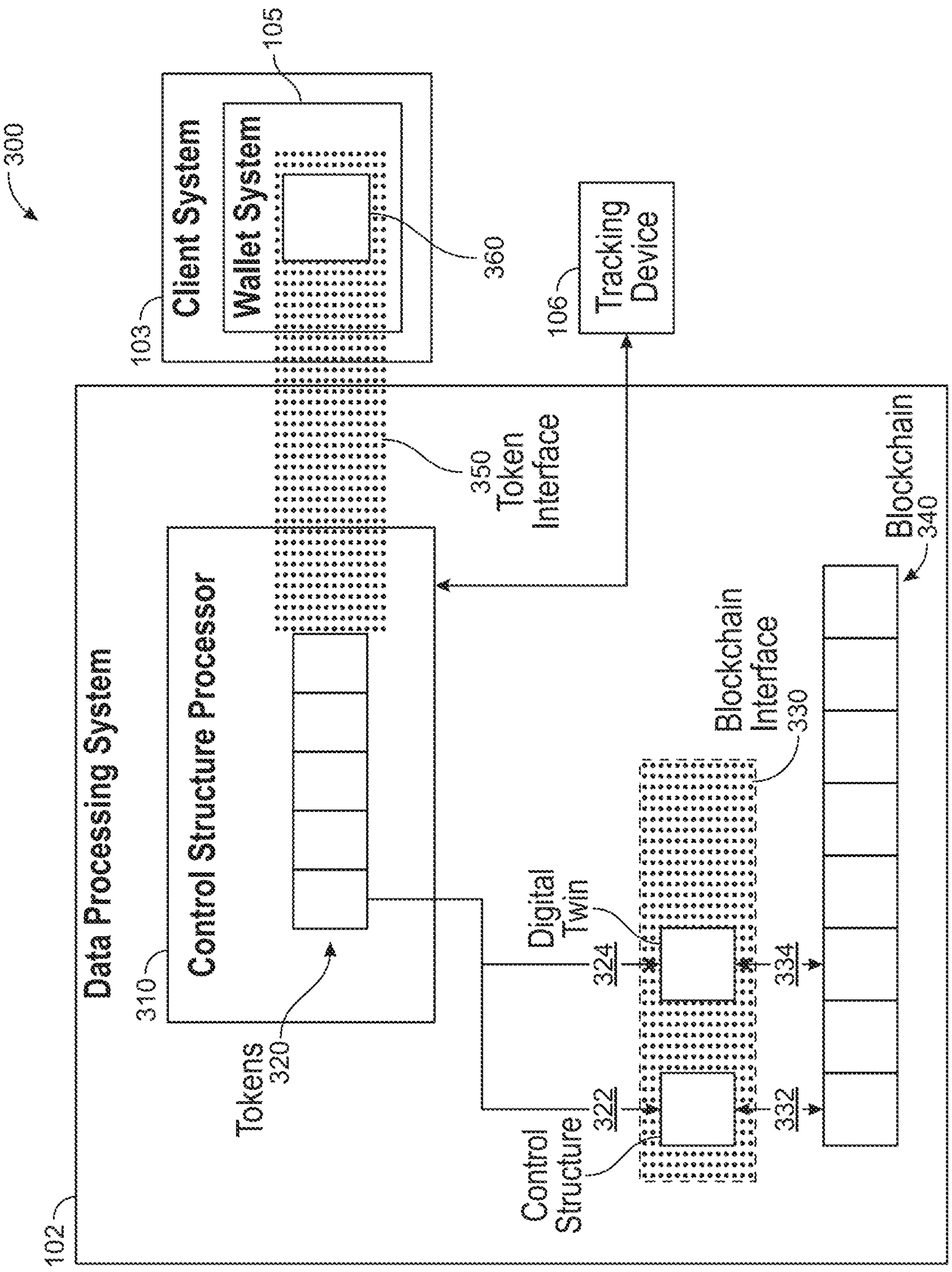
FIG. 3 depicts an example protection architecture, according to some implementations.

Referring now to FIG. 3, which depicts an example data processing system 102 in twinning architecture 300, in accordance with present implementations. As illustrated in FIG. 3, the data processing system 102 can utilize a blockchain 340 to log and verify exchanges involving tokens 320 of physical assets and their associated digital twins via digital twin link 324. This blockchain 340 can be a decentralized record, providing data consistency and immutability across networked transactions. Tokens 320 can be managed by the control structure processor 310. Each token 320 can be linked to a digital twin through digital twin link 324 and to a control structure through control structure link 322. The control structure and the digital twin are both shown in the blockchain interface 330, which manages interactions with the blockchain 340.

As used herein, a "smart contract control structure," "metadata control structure," and "control structure" can be a computer program (also known as a program, software, software application, script, or code) configured to combine one or more attributes of the digital or physical asset together to create a single control structure for each metadata object (e.g., digital twin metadata object). In some implementations, the data processing system 102 can implement and execute a control structure to output, append, or update metadata objects of one or more tokens (e.g., digital twins, and tokens) to include one or more metadata, attributes, and conditions (e.g., smart contracts), fields, a value, and so on. The control structure can be written in any form of programming language, including compiled or interpreted languages, and/or declarative or procedural languages, and it can be deployed in any form, including as a stand-alone program or as a circuit, component, subroutine, object, or other unit suitable for use in a computing environment. A metadata object can, but need not, correspond to a file in a file system. A metadata object can be stored in a portion of a file that holds other programs or data (e.g., one or more scripts stored in a markup language document), in a single file dedicated to a token in question, or in multiple coordinated files (e.g., files that store one or more subsystems, sub-programs, or portions of code). A control structure can be deployed to be executed on one computer or on multiple computers that are located at one site or distributed across multiple sites and interconnected by a communication network. The processes and logic flows described in this specification can be performed by one or more programmable processors executing one or more control structures (or computer programs) to perform actions by operating on input data (e.g., off-chain data, tracking data, exchange data, on-chain data, etc.).

As used herein, the phrase "smart contract" generally refers to self-executing code (e.g., in a ledger network or other system) that executes when a set of conditions that have been agreed upon by the parties of the smart contract are met. Although the FIGS. and specification generally discuss utilizing smart contracts on tokens, the systems, methods, and apparatuses disclosed herein can also be used for a plurality of types of non-fungible or fungible assets, such as but not limited to commodities, common shares, options, dollar bills, fiat currency, digital currency, tokens, deeds, leases, wills, other exchanges, non-smart contracts, traditional legal contracts, financial disbursements, taxes, and other types of non-fungible or fungible assets parties use and exchange. Parties to the smart contract for tokens or other types of non-fungible or fungible assets can be individuals, companies, organizations, entities, providers, and so on.

The data processing system 102 also can include a blockchain interface 330 that facilitates communication between the blockchain 340 and both digital twins and control structures. The blockchain interface 330 can facilitate on-chain updates and off-chain updates that. Tokens 320 can be managed by the control structure processor 310. The tracking device 106 can communicate with the control structure processor 310 to monitor and manage the physical state and location of the assets. In some implementations, the tracking device 106 can include various types of sensors, such as RFID tags, GPS modules, or other tracking technologies, to detect and report the real-time status of a physical asset. These sensors can continuously or periodically transmit data to the control structure processor 310, ensuring that any movement or change in the physical state of the asset is accurately recorded in the digital twin.

Communication between the tracking device 106 and the control structure processor 310 can be established via a secure communication protocol. This protocol can include encryption methods to ensure the integrity and confidentiality of the transmitted data. For example, the tracking device 106 can use a secure communication link to send updates regarding the physical asset's location, condition, and other relevant metrics to the control structure processor 310. In some implementations, the control structure processor 310 can then use this data to update the corresponding digital twin 324 through the digital twin link 324 and the blockchain interface 330. This process can confirm that any changes in the physical state of the asset are reflected in its digital representation on the blockchain 340. The link 334 from the digital twin to the blockchain 340 allows for the secure and immutable recording of these updates.

In some implementations, the tracking device 106 can also receive commands from the control structure processor 310. For example, if a digital transaction affecting the asset occurs, the control structure processor 310 can send a command to the tracking device 106 to perform a specific action, such as updating a display or triggering an alert. The integration of the tracking device 106 within the data processing system 102 provides a mechanism for ensuring the accuracy and integrity of asset tracking. By continuously monitoring the physical assets and updating their digital twins on the blockchain 340, the data processing system 102 can provide real-time visibility and verification of asset status.

The client system 103 can interface with the data processing system 102 to manage and interact with digital assets through its integrated wallet system 105. The client system 103 can be operated by various entities, including individuals, companies, or financial institutions, to access, store, and manage their digital tokens. In some implementations, the wallet system 105 within the client system 103 serves as a secure repository for storing digital tokens 360. The wallet system 105 can securely store private keys and other cryptographic information necessary for accessing and managing the tokens. It can support various types of tokens, including fungible tokens, non-fungible tokens (NFTs), and semi-fungible tokens. The wallet system 105 can provide users with a user-friendly interface for viewing their token, transaction history, and other relevant information.

The token 360, stored within the wallet system 105, can represent a digital asset or right that can be traded, held, or used within the larger ecosystem of financial products and services. Each token 360 can correspond to a unique identifier and can be linked to specific digital assets or metadata objects, such as digital twins. The tokens can be transferred between different wallet systems through secure transactions. In some implementations, the token interface 350 facilitates the interaction between the client system 103 and the data processing system 102. Through the token interface 350, tokens 360 can be securely transferred to and from the wallet system 105. This interface ensures that transactions involving the tokens can be accurately recorded on the blockchain 340 via the blockchain interface 330.

In some implementations, a link (e.g., link 322, 324, 332, 334) can be a reference mechanism that connects tokens to either other tokens or metadata objects, establishing a relationship between them. These links can be used to track and allow operational consistency across the data processing system 102. For example, link 322 connects digital twins to their respective tokens 320, and link 332 can connect each control structure to the blockchain 340, facilitating data retrieval and interaction based on blockchain 340's immutable record system. In some implementations, a metadata object, such as a digital twin metadata object, can be a structured data entity that stores descriptive information about the characteristics and state of a physical asset. This information can include, but is not limited to, ownership details, historical transaction data, and specific attributes related to the asset. For example, the asset metadata object 334 store hold data pertaining to a physical asset the digital twin represents, such as a promissory note, mortgage, bond, lease agreement, stock certificate, commodity, or any other financial instrument or economic asset.

In some implementations, a token 320 can represent a digital asset or a right that can be traded, held, or used as part of a larger ecosystem of financial products and services. Tokens can be fungible, where each token is identical to others and interchangeable (like traditional currency), non-fungible (NFT), where each token has unique properties and is not interchangeable, or semi-fungible, combining aspects of both. For example, a token 320 can include a link to the digital twin (e.g., digital twin link 324) and a link to a digital wallet (e.g., wallet system 105). The link to the digital wallet can be represented as token 360 in the wallet system such that token 360 can facilitate secure storage and management of the digital asset. That is, while token 360 is stored in the wallet system 105, it maintains a connection to its corresponding token 320 and digital twin, facilitating updates and transactions. For example, token 320 can be transferred between different wallet systems, and token 360 can be updated accordingly to reflect the changes in ownership or status.

The tokens 320 can correspond to a particular metadata object or metadata objects, such as digital twin metadata object (e.g., digital twin). A token 320 can digitally represent an asset on a blockchain and can serve as proof of ownership of or rights to a specific asset or pool of assets (e.g., pools of digital twins, also referred to herein as controllable electronic records). The token 320 can be verified by anyone on blockchain 340 and the token ensures the authenticity of the physical asset or assets. Each token 320 can store a data value composed of at least a token identifier and a contract number. The token identifier can be a unique set of characters (e.g., numbers, symbols, and letters) uniquely identifying the specific token. For example, token identifier #1 can be identified as "G8fNM64!", and token identifier #2 can be identified as "lkj93IOs."

The processor or processing circuits of the data processing system 102 can execute one or more actions with respect to various cryptographic keys, tokens, control structures, and smart contracts. For example, the data processing system 102 can modify links between various tokens, control structures, and smart contracts with various public-private key pairs. The blockchain 340, within a blockchain storage, can include at least one blockchain including one or more of the blocks. The blockchain 340 can be linked with one or more metadata objects, tokens, and smart contract control structures. The blockchain 340 can include a blockchain operated and controlled at the data processing system 102. The blockchain 340 can include a plurality of blockchains each corresponding to particular aspects of the links associated with the corresponding blockchains. The data processing system 102 can include a blockchain 340—a decentralized ledger to record exchanges, tracking data, token information, smart contracts, etc. within and external the data processing system 102. The blockchain 340 can be used to provide reconciliation of physical-to-digital and digital-to-physical tracking. For example, the blockchain 340 can record the transfer of ownership of a physical asset. In another example, the blockchain 340 can log the environmental conditions of a physical asset tracked by an RFID tag. Within the data processing system 102, a control structure processor 310 can manage tokens 320, which can be either non-fungible tokens (NFTs) or fungible tokens. Each token 320 can serve as a digital representation of one or more physical assets further represented in digital twins.

Each token 320 can link to its respective digital twins through a link 324. Link 324 can include a reference, pointer, or the like, to or between a token 320 and a digital twin. Link 324 can be used to establish and maintain the relationship between a token 320 and its contained digital twin, providing that updates to physical asset are accurately reflect changes in its associated digital twin. Each token 320 can link to its respective control structure through a link 322. Link 322 can include a reference, pointer, or the like, to or between a token 320 and a control structure. Link 322 can be used to establish and maintain the relationship between a token 320 and its control structure, providing executable code to verify an off-chain condition of the at least one physical asset.

The digital twin can be a controllable electronic record. Link 334 can include a reference, pointer, or the like, to or between a digital twin 324 and a control structure. Link 332 can be used to ensure that every digital twin 324 has accessible, up-to-date information on its characteristics. For example, potential investors can examine the metadata to assess risk and potential returns before acquiring a digital twin 324. One or more control structures and digital twins can contain a link (e.g., links 332 and links 334) to the blockchain 340, which can store information about the control structure and digital twin. The links can include a reference, pointer, or the like, to or between a control structure or digital twin and the blockchain 340.

The blockchain interface 330 can be a communication channel between the tokens 320, digital twins 324, and their respective metadata objects. The blockchain interface 330 facilitates the exchange of metadata information to the blockchain 340, via links 332 and 334, such that all recorded data remains current and accurate. For example, updates made to a digital twin can be relayed or communicated via the blockchain interface 330 to the blockchain 340, keeping the blockchain's records synchronized with real-world changes (e.g., of the physical asset).

In some implementations, the control structure processor 310 can manage the rules and conditions under which data from the digital twin metadata object and control structures can be accessed and modified. The control structure processor 310 can restrict outputs of the digital twin metadata object and control structures by coded rules within the smart contract code of control structure processor 310 that govern the release and modification of metadata-controlling digital-to-physical updates and physical-to-digital updates. In some implementations, the control structure processor 310 and the blockchain 340 can be implemented using a combination of hardware and software within the data processing system 102. Central Processing Units (CPUs) of the data processing system 102 can execute the smart contract logic, which is written in a programming language, compiled into bytecode, and deployed on blockchain 340. Memory storage of the data processing system 102 can store the current state for rapid access and updating during transaction processing, and persistent storage archives the complete history of all blockchain transactions. The various components can allow the control structure processor 310 to manage access and modifications to metadata objects associated with tokens 320 and digital twins, and the blockchain interface 330 can dynamically manage the digital twins.

While FIG. 3 depicts a single control structure linked (by link 322) to a single token 320, and the single token 320 is linked (by link 324) to a digital twin, it should be understood that this representation is illustrative. In implementation, a plurality of tokens 320 can each be linked to various control structures and connected to various digital twins.

Figure 4:
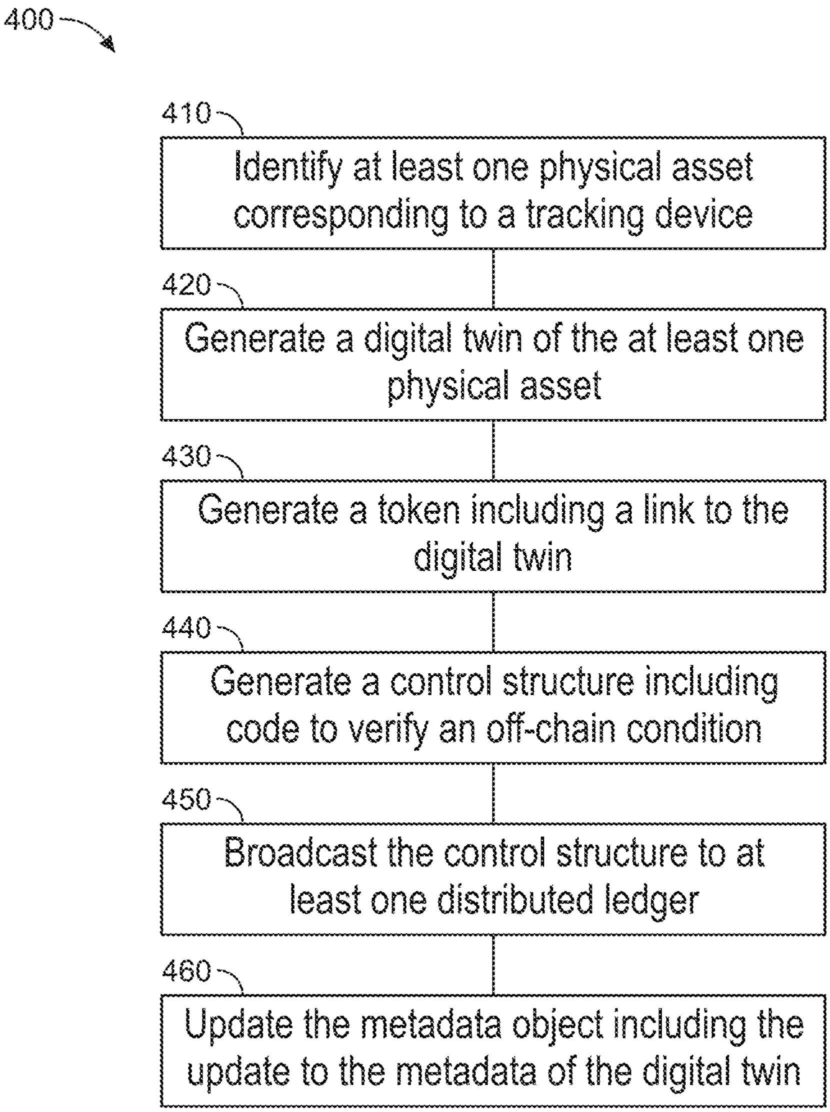
FIG. 4 depicts a method of twinning and/or tracking assets on-chain and off-chain, according to some implementations.

Referring now to FIG. 4, depicting a method to twin and/or track assets on-chain and off-chain, according to some implementations. At least one of the example systems of FIG. 1, or the example twinning architecture 300 of FIG. 3, can perform method 400 according to present implementations.

In broad overview of method 400, at block 410, the one or more processors (e.g., protection system 110, specifically interface controller 120) can identify at least one physical asset corresponding to a tracking device. At block 420, the one or more processors (e.g., twinning processor 140) can generate a digital twin of at least one physical asset. At block 430, the one or more processors (e.g., token generator 112) can generate a token including a link to the digital twin. At block 440, the one or more processors (e.g., tracking processor 130) can generate a control structure including code to verify an off-chain condition. At block 450, the one or more processors (e.g., interface controller 120) can broadcast the control structure to at least one distributed ledger. At block 460, the one or more processors (e.g., metadata I/O processor 110) can update the metadata object including the update to the metadata of the digital twin.

In some implementations, additional, fewer, or different operations can be performed in method 400 depending on the particular implementation. In some implementations, some, or all operations of method 400 can be performed by one or more processors executing on one or more computing devices, systems, or servers. In various implementations, at least one operation can be re-ordered, added, removed, or repeated. Additionally, some or all of the operations performed by the blocks can be removed or added.

Referring to method 400 generally, method 400 relates protecting assets including physical-to-digital tracking and digital-to-physical tracking. In some implementations, method 400 can address the technical challenge of reconciling physical movements of assets that are not inherently tracked by blockchain technology. By creating a digital representation of physical assets, such as promissory notes, method 400 facilitates the monitoring and management of assets in a digital environment. The processors can interact and communicate with tracking devices, such as RFID tags, to monitor the physical movement of the assets. For example, the tracking devices can send information updates to the processors, ensuring that the digital twin on the distributed ledger accurately reflects the physical state of the asset. For example, a data payload including a unique note identifier, the chain, and the location of the note can be transmitted to the processors. The chain identifier can be used by the processor to identify the relevant blockchain and update the information accordingly. As shown, any physical changes in the asset can then be mirrored in its digital twin (e.g., on a blockchain). Thus, method 400 facilitates the synchronization of physical and digital records, improving the reliability of asset management.

In some implementations, method 400 can be implemented to duplicate off-chain activities on-chain. That is, the activities can include those that originated off-chain or have components that exist off-chain. For example, a promissory note, which is a physical asset, can be tracked using an RFID tag. In this example, the RFID tag can monitor the physical location and status of the note, transmitting this data to the processors for recordation and/or reconciliation. The digital twin of the note, which can include a unique identifier and metadata, can be used as a persistent digital representation of the physical asset. The processors can automatically update the digital twin on a distributed ledger based on the data received from the RFID tag. As shown, the processors can ensure that the digital record remains accurate and reflects the current state of the physical asset. By duplicating off-chain activities on-chain, method 400 enhances the traceability and verification of physical assets. The implementations described in method 400 contrast with pure native assets that exist solely on the blockchain, which do not require such reconciliation. Thus, method 400 provides a technical solution for protecting and tracking both physical and digital aspects of asset ownership and movement.

In some implementations, the processors of method 400 can use tracking devices to monitor physical assets and update digital counterparts on the blockchain. For example, a promissory note equipped with an RFID tag can have its movements tracked in real-time. The data from the RFID tag, including the note's location and status, can be transmitted to the processors for reconciliation on a blockchain. That is, the digital twin of the note can be updated to reflect this information. Additionally, the processors of method 400 can perform the reverse process, where changes in the digital record can be reflected in the physical asset. For example, if a digital transaction occurs that affects the note, this change can be communicated to the physical asset. This bidirectional synchronization improves the reliability and accuracy of asset protection and tracking. By ensuring that physical and digital records are aligned, method 400 provides an improved technical solution for tracking and protecting assets-digital and physical.

Method 400 can also be used to facilitate the creation of a secure and tamper-resistant digital environment for physical assets. The processors can seal a physical asset in a digitized package, ensuring that any tampering is detected and reported. For example, a promissory note can be placed in a sealed envelope equipped with sensors and RFID tags. In this example, any attempt to tamper with the envelope can trigger an alert, which can then be transmitted to the blockchain by the processors. In some implementations, the alert can include details such as the timestamp, the unique identifier of the note, and the nature of the tampering attempt. By recording this information on the blockchain, the processors can provide a verifiable record of the asset's integrity. As shown, the processors can enhance the security of physical assets and ensure that any unauthorized changes are detected and reported. Additionally, method 400 can be used to transfer ownership of digital twins, verifying that the digital record reflects changes in ownership of the physical asset.

Still referring to method 400 generally, in some implementations, the processors of method 400 can perform digital-to-physical tracking. That is, the processors can replicate digital movements of the asset to the physical asset. For example, if a digital transaction occurs that affects the ownership or status of a promissory note, this change can be reflected in the physical asset. The processors can use technologies such as RFID tags and smart contracts to ensure that the physical asset is updated accordingly. For instance, a small screen on the package of the note can display updates from the blockchain. This can allow users to verify the status of the note and ensure that it matches the digital record. Additionally, the processors can link a chip on the physical asset to the blockchain, using a mapping scheme to correlate the digital and physical states.

At block 410, the processors (e.g., interface controller 120) can identify at least one physical asset corresponding to a tracking device. That is, the physical asset can be a promissory note, a mortgage deed, a secured bond, a loan agreement, a stock certificate, a financial contract, a title deed, a collateral document, a negotiable instrument, or any physical asset related to financial transactions. Additionally, the tracking device can be an RFID tag, a GPS tracker, a Bluetooth beacon, a Wi-Fi-enabled device, a motion sensor, a temperature sensor, a humidity sensor, a pressure sensor, or any sensor configured to provide tracking data. In some implementations, the tracking device can periodically transmit data to the processors. That is, the processors can communicate with the tracking device over a communication network. For example, the communication can be using a secure connection where the processors can authenticate the tracking device. In another example, the communication can be in response to establishing a communication session between the processors and tracking device where the processors can initiate data transfer. In some implementations, the processors can communicably couple to the tracking device by using encrypted communication channels. For example, the secure channel can use encryption protocols to ensure data integrity and confidentiality.

In some implementations, identifying the physical asset corresponding to the tracking device can include the processors communicating with or receiving a communication from the tracking device and verifying the unique identifier. For example, the processors can match the identifier to a record in the database. In some implementations, identifying the physical asset corresponding to the tracking device can include the processors performing a lookup operation. For example, the processors can query the database to retrieve asset details. Additionally, a physical asset can correspond to a tracking device when the unique identifiers match. For example, a promissory note (e.g., physical asset) can correspond to an RFID tag (e.g., tracking device) when the note's identifier matches the tag's identifier. In another example, a mortgage deed (e.g., physical asset) can correspond to a GPS tracker (e.g., tracking device) when the deed's identifier matches the tracker's identifier.

In some implementations, a display or output device can also be associated with the physical asset. Additionally, the display or output device can be coupled to the physical asset or at least in relation to the physical asset (e.g., the display is on an envelope encapsulating the physical asset). For example, the display can show the current status of the asset. In some implementations, the display or output device can be communicably coupled to the tracking device and/or processors such that updates can be shown in real-time. For example, the processors can provide status updates to a display such that the display can show the current location or status of the asset. In another example, the tracking device can provide data to an output device such that the output device can show alerts or updates.

In some implementations, the processors can establish the communication link with the tracking device by performing a handshake protocol (e.g., Diffie-Hellman, TLS, SSL) and exchange one or more cryptographic keys (e.g., RSA, AES, ECC) to establish the communication link. For example, a handshake protocol can be initiated to authenticate the devices. In this example, a first cryptographic key can be the public key of the processor and a second cryptographic key can be the private key of the tracking device. That is, an exchange of cryptographic keys can facilitate the communication link by establishing a secure channel. That is, the communication link can be for (i) transmitting one or more updates of the digital twin to the tracking device and/or (ii) receiving the tracking data from the tracking device. For example, an update to the digital twin can be a location change. In another example, an update to the digital twin can be a status change. In yet another example, tracking data of the tracking device can be the current location. In yet another example, tracking data of the tracking device can be the current condition of the asset.

At block 420, the processors (e.g., twinning processor 140) can generate a digital twin of the at least one physical asset. In some implementations, the digital twin can include a unique identifier, and a metadata object corresponding to the at least one physical asset. Additionally, the digital twin can correspond to a persistent representation of the at least one physical asset (e.g., digitally representing the physical asset but also synced, such that if an update to either occurs, the other will be updated). Generally, a digital twin can be a virtual model. In some implementations, generating the digital twin can include the processors creating a digital replica. That is, the digital twin can be generated by mapping the physical asset's attributes. For example, the processors can capture the asset's characteristics. In another example, the processors can record the asset's metadata. Additionally, the generation of the digital twin can include linking the physical asset to its digital counterpart. For example, the processors can generate the digital twin by associating the physical asset's identifier with the digital twin's identifier.

Generally, a persistent representation can be a continuously updated model. That is, the digital twin can be a persistent representation of the physical asset in that it can reflect real-time changes. For example, the digital twin can persistently represent the asset's location such that any change in the physical location is reflected in the digital twin. In another example, the digital twin can persistently represent the asset's status such that any change in the physical status is reflected in the digital twin. In some implementations, being synced can refer to real-time updates. That is, the processors can sync the digital twin to the physical asset using continuous data streams. For example, syncing can include receiving constant updates from the tracking device. In another example, syncing can include sending regular status checks to the tracking device.

In some implementations, the unique identifier can be a serial number, a UUID, a barcode, a digital watermark, or any distinct identifier. For example, the unique identifier can be a serial number printed on the asset. In another example, the unique identifier can be a UUID associated with the asset. In some implementations, the metadata can be ownership details, historical data, status information, transaction records, or any data structure that can provide information about the asset. For example, the metadata object can be a record of all transactions related to the asset. In another example, the metadata object can be a log of all status changes. In some implementations, the metadata object can correspond to the physical asset by containing specific details about the asset. For example, the metadata object can include the asset's purchase date. In some implementations, the metadata object can correspond to the physical asset by including the asset's current owner. For example, the metadata object can list the asset's current custodian.

In some implementations, the metadata of the metadata object can include ownership information, custodian information of the at least one physical asset, and/or historical data of the at least one physical asset. That is, the ownership information can include the name and contact details of the current owner. For example, the ownership information can be the current owner's digital wallet address. In another example, the ownership information can be the current owner's identification details. That is, the custodian information can include the name and contact details of the person or entity responsible for the asset. For example, the custodian information can be the custodian's digital wallet address. In another example, the custodian information can be the custodian's identification details. Additionally, the historical data can refer to previous transactions and status changes of the asset. For example, the historical data can include a plurality of previous states and a plurality of previous updates of the metadata object. In this example, the previous states can be the asset's condition over time and the previous updates can be the changes in the asset's location.

At block 430, the processors (e.g., token generator 112) can generate a token including a link to the digital twin. In some implementations, the token can be linked to a first digital wallet. In some implementations, the token can include a cryptographic object (e.g., hash, digital signature, encryption key, checksum, unique identifier, or any secure element) of the metadata object. For example, the token can include a hash of the metadata object. In another example, the token can include a digital signature of the metadata object. That is, the cryptographic object can be generated using a cryptographic function (e.g., SHA-256, RSA, ECC, MD5). Generally, the token structure can be a secure, digital representation. For example, the token can be an encrypted string and can include a hash, a link including the digital twin's identifier, and a timestamp. In another example, the token can be a signed document and can include a digital signature, a hash, and a timestamp.

In some implementations, generating the token can include creating a secure link to the digital twin. That is, the link to the digital twin can be an encrypted URL. For example, the processors can generate the token by hashing the metadata object. In another example, the processors can generate the token by digitally signing the metadata object. In some implementations, the digital wallet can be operated by the owner and have an ownership interest in the physical asset. For example, the token can be linked to the digital wallet by associating the wallet's address with the token. In this example, the digital wallet corresponds to a mobile device of the owner of the digital asset. In another example, the token can be linked to the digital wallet by encrypting the wallet's address within the token. In this example, the digital wallet corresponds to a computing system of a company or provider with an ownership interest in the digital asset.

At block 440, the processors (e.g., tracking processor 130) can generate a control structure (e.g., smart contract) including executable code to verify an off-chain condition (e.g., any change to the physical asset, whereas on-chain conditions can be any changes to the token) of the at least one physical asset. Generally, the control structure can include executable code to manage and verify conditions related to the physical asset. That is, the executable code can be executed by the processors or a blockchain to facilitate real-time tracking and management. For example, the control structure can be a smart contract configured to verify the status of a promissory note based on data from the tracking device. In some implementations, generating a control structure can include defining rules and conditions within the smart contract. That is, the processors can generate the control structure by specifying conditions for asset tracking and management. For example, the processors can generate a smart contract (e.g., control structure) by coding the rules for verifying the location and status of the asset. In another example, the processors can generate a control structure by defining actions to be taken when specific conditions are met.

In some implementations, the off-chain condition can correspond to tracking data of the tracking device via a communication link using the control structure. That is, the executable code of the control structure can be executed to verify the physical status and location of the asset. Additionally, to verify an off-chain condition of a physical asset, the control structure can be configured to receive and process tracking data from the device. For example, to verify an off-chain condition of a promissory note, the processors or a blockchain can use a smart contract to check the received location data against the expected location. In another example, to verify an off-chain condition of a mortgage deed, the processors or a blockchain can use the control structure to ensure the deed is in the correct custody. In yet another example, to verify an off-chain condition of a financial contract, the processors or a blockchain can use the control structure to confirm the contract's status as per the tracking device data.

In some implementations, the control structure can restrict (i) outputs of the metadata object and/or (ii) updates to the digital twin. Generally, restricting outputs refers to limiting access to the metadata object based on predefined conditions. That is, to restrict outputs the executable code of the control structure can define permissions and access levels. For a control structure to restrict outputs of the metadata object, the processors can enforce access control rules. For example, an output of the metadata object can be a request for information about the physical asset. In this example, the request for information can be for verifying ownership details. In this example, the control structure can restrict the output by allowing access only to authorized users. In another example, an output of the metadata object can be an update to the physical asset's ownership based on a trade or exchange of the digital twin on a blockchain. In this example, the request to update can be for transferring ownership. In this example, the control structure can restrict the output by requiring multi-factor authentication.

Additionally, for a control structure to restrict updates to the digital twin, the processors can enforce validation rules. For example, an update of the digital twin can be a request to update a location corresponding to the physical asset. In this example, the request for information can be for confirming the new location. In this example, the control structure can restrict the output by verifying the tracking data before updating the location. In another example, an output of the metadata object can be an update to the physical asset's condition. In this example, the request to update can be for recording the asset's status change. In this example, the control structure can restrict the output by ensuring the update is authenticated and authorized.

At block 450, the processors (e.g., interface controller 120) can broadcast the control structure to at least one distributed ledger. Generally, the processors can broadcast by sending the control structure to the blockchain network. In some implementations, broadcasting can include generating a first record on the at least one distributed ledger for the control structure. For example, generation of the first record can include encoding the control structure into a blockchain transaction. In some implementations, the processors can communicate and/or broadcast the control structure to the distributed ledger using a ledger API, blockchain protocol, smart contract language, or any suitable interface. For example, when the control structure is a smart contract, the processors can broadcast the smart contract to the distributed ledger by submitting it to the blockchain network. For example, when the control structure is a set of rules, the processors can broadcast the smart contract to the distributed ledger by encoding the rules into a blockchain transaction. In some implementations, the distributed ledger can be public (e.g., Ethereum, Bitcoin, Hyperledger), private (e.g., internal to a company secured from external system interactions, internal to a financial institution, consortium blockchain), or semi-private (e.g., shared amongst companies or providers but secured from external system interactions, permissioned blockchain, consortium blockchain). In some implementations, broadcasting can include propagating the control structure to a plurality of network nodes (e.g., miners, validators, peers) through a consensus mechanism (e.g., Proof of Work, Proof of Stake, Byzantine Fault Tolerance). For example, the processors can submit the control structure to the network. In this example, propagating can occur using blockchain consensus protocols.

In some implementations, the processors (e.g., interface controller 120) can receive tracking data of the tracking device (e.g., monitoring the RFID or sensor attached physically to the asset). That is, the processors can monitor the physical asset by continuously receiving data from the tracking device. For example, the processors can log the asset's movements and status updates. Additionally, the tracking data can correspond to an update to metadata (e.g., an exchange of the physical asset, ownership transfer, location change, condition update, custody change) of the at least one physical asset. That is, the tracking data can be a data package including information about the asset's current status. For example, the processors can receive location updates (e.g., tracking data) when the asset is moved. In another example, the processors can receive status updates (e.g., tracking data) when the asset's condition changes.

In some implementations, the processors (e.g., interface controller 120) can also broadcast the tracking data to the at least one distributed ledger. Similar to above, broadcasting can include the processors submitting the tracking data to the blockchain network. However, unlike broadcasting a control structure, the tracking data can be broadcast by creating a transaction on the blockchain. For example, broadcasting the tracking data can include generating a second record on the at least one distributed ledger for the tracking data and ensuring its propagation. In this example, the tracking data can be location information and the second record can be a blockchain transaction. That is, the second record can be generated by encoding the tracking data into a blockchain transaction.

In some implementations, the processors can also broadcast the token to the at least one distributed ledger. Similar to above, broadcasting can include the processors submitting the token to the blockchain network. However, unlike broadcasting a control structure or tracking data, the token can be broadcast by creating a specific type of transaction on the blockchain. For example, broadcasting the token can include generating a third record on the at least one distributed ledger for the token and ensuring its verification. In this example, the token can be a digital representation of ownership and the third record can be a blockchain transaction.

That is, the third record can be generated by encoding the token into a blockchain transaction. That is, the token and the control structure can be independently verifiable on the at least one distributed ledger such that each can be validated separately. For example, the token can be verified by checking its digital signature, and the control structure can be verified by executing its code.

At block 460, the processors (e.g., metadata I/O processor 110) can update the metadata object using the control structure (e.g., sync the updates of the physical asset with the digital twin). In some implementations, the processors can use the control structure by executing the smart contract to update the metadata. That is, the update can include updating the metadata of the digital twin based on the tracking data. For example, the processors can use a smart contract (e.g., control structure) to update the metadata by verifying the tracking data and recording the changes. In this example, the metadata can be updated from the previous location to the current location based on the tracking data. In another example, the processors can use a smart contract to update the metadata by validating the status change and recording it. In this example, the metadata can be updated from the previous condition to the current condition based on the tracking data.

In some implementations, updating can include the processors verifying the update to the metadata based on a digital signature of the tracking data. That is, the digital signature can be an encrypted validation, a cryptographic hash, or any secure verification generated by the tracking device. Generally, signing can include encrypting the data and the digital signature can represent the authenticity of the tracking data. Additionally, the tracking device can sign the tracking data to ensure its integrity and authenticity. For example, when the location of a promissory note is being shipped or transferred from a storage facility to a new location, the tracking device can transmit and sign tracking data to the processors for updating the digital twin. In another example, when a mortgage deed is moved to a new custodian, the tracking device can transmit and sign tracking data to the processors for updating the digital twin.

Additionally, updating can include the processors verifying an actual state of the at least one physical asset corresponds to an expected state of the at least one physical asset based on accessing the link to the digital twin in the token. In some implementations, an actual state can be the current condition or location of the physical asset. That is, the processors can determine the actual state by receiving and verifying tracking data. For example, an actual state can be the current location of a promissory note. In another example, an actual state can be the current condition of a secured bond. In some implementations, an expected state can be the predefined or recorded condition or location of the physical asset. That is, the processors can determine the expected state by accessing the metadata object. For example, an expected state can be the last recorded location of a mortgage deed. In another example, an expected state can be the last recorded condition of a stock certificate. Additionally, the control structure, such as a smart contract, can restrict the output of the expected state. For example, the processors can access the expected state by querying the blockchain. Thus, the update of the metadata object can be responsive to verifying the actual state corresponds to the expected state. For example, the actual state can correspond to the expected state when the current location matches the recorded location.

Still referring to method 400, the processors can receive a transfer request including a transfer to a new owner, a current owner digital signature of a current owner of the at least one physical asset, and a new owner digital signature of the new owner. For example, the transfer request to transfer to the new owner can include the new owner's digital wallet address. In this example, the current owner digital signature can be a cryptographic signature verifying the transfer. Additionally, the new owner digital signature can be a cryptographic signature accepting the transfer. In some implementations, the transfer request can be a single data package including the new owner information and the current owner and new owner digital signatures. For example, the processors can receive the transfer request as a blockchain transaction. In some implementations, the transfer request can be a group of data packages that includes the new owner information, the current owner, and new owner digital signatures in separate data communications and/or packages. For example, the processors can receive the transfer request in multiple steps. In this example, the current owner can initiate the transfer. Additionally, in this example, the new owner can confirm the transfer.

In some implementations, in response to receiving the transfer request, the processors can transfer, using the control structure, the at least one physical asset to a new owner. That is, the physical asset transfer can be reconciled on the distributed ledger using the control structure. For example, a smart contract can be executed such that the ownership is updated on the blockchain. In this example, the transfer can be reconciled when the smart contract validates the digital signatures. In some implementations, the transfer of ownership can include updating the metadata object of the digital twin based to reflect ownership by the new owner. For example, the metadata object can be updated using a smart contract by the processors to record the new owner. Additionally, the transfer of ownership can also include verifying the current owner digital signature and the new owner digital signature. That is, the processors can verify signatures by checking the cryptographic validity. For example, the current owner digital signature can be verified by matching it to the owner's public key. In another example, the new owner digital signature can be verified by matching it to the new owner's public key.

In some implementations, the processors can record the transfer on the at least one distributed ledger during the transfer of ownership. For example, the processors can create a blockchain transaction recording the transfer. In some implementations, the transfer of ownership can further include generating a new token corresponding to the new owner. That is, the processors can generate the new token by creating a new digital representation of ownership. Additionally, the new token can correspond to the new owner such that it reflects the updated ownership information. For example, the new token can include a link to the updated metadata object (e.g., with the new ownership information). Additionally, the new token can be linked to a second digital wallet of the new owner and the token (e.g., associated with the old physical asset owner) can be marked as inactive or expired. For example, the old token can be deactivated on the blockchain. That is, the second digital wallet can be associated with the new owner's address. In this example, the processors can mark the token as inactive or expired by updating the blockchain record.

In some implementations, the processors can detect, using the control structure, a discrepancy between either (i) the actual state and the expected state and/or (ii) an actual location of the at least one physical asset and an expected location of the at least one physical asset based on accessing the link to the metadata object in the token. That is, the processors can detect, using the control structure, a discrepancy in the actual state and the expected state by comparing the received tracking data with the recorded data. For example, a discrepancy can be detected when the current location does not match the expected location. Additionally, the processors can detect, using the control structure, a discrepancy in the actual location of the at least one physical asset and the expected location of the at least one physical asset based on accessing the link to the metadata object in the token by querying the blockchain. For example, a discrepancy can be detected when the asset is reported in a different location than recorded. In this example, the smart contract can restrict access to the metadata object using the link. That is, for the processors to access the metadata object to determine the expected location, the processors can query the blockchain for the latest recorded location.

In some implementations, the processors can generate and record an alert on the at least one distributed ledger based on the discrepancy. For example, the alert can indicate a potential issue and can be recorded by creating a blockchain transaction. In some implementations, the alert generated by the control structure can include (i) a timestamp indicating a time of the detected discrepancy, (ii) the unique identifier of the at least one physical asset, (iii) the expected state and the actual state of the at least one physical asset, and/or (iv) a recommended action for resolving the discrepancy. For example, the timestamp indicating a time of the detected discrepancy can be a UTC timestamp. In another example, the unique identifier can be the asset's serial number. In yet another example, the expected state can be the last recorded condition and the actual state can be the current condition. In yet another example, the recommended action can be to verify the asset's location manually.

In some implementations, the processors can re-verify the metadata object and the token based on the tracking data according to a periodic schedule (e.g., continuously, daily, weekly, monthly). That is, re-verifying can include determining a current cryptographic object of the metadata object and validating the current cryptographic object (e.g., hash, digital signature, checksum) based on the current cryptographic object matching the cryptographic object of the metadata object. For example, the processors can compare the current hash with the stored hash. In another example, the processors can verify the digital signature of the metadata object.

In some implementations, the processors can re-verify, according to a periodic schedule, the actual state of the at least one physical asset. That is, re-verifying the at least one physical asset can include obtaining updated tracking data from the tracking device and verifying the updated tracking data against the expected state of the at least one physical asset as recorded in the metadata object. For example, the processors can compare the current location data with the recorded location data. In another example, the processors can verify the current condition data against the recorded condition data.

Referring to digital-to-physical tracking generally, digital-to-physical tracking involves updating the physical asset based on changes in its digital twin. For example, if a promissory note's ownership is transferred digitally, the physical asset's associated tracking device or output display can be updated to reflect this change. In some implementations, the processors can send a command to the tracking device to display the new ownership information. In another example, if the status of a mortgage deed is updated digitally (e.g., marked as paid), the physical deed's tracking device can be updated to show this status change. By ensuring that digital changes are reflected physically, digital-to-physical tracking maintains the consistency and reliability of asset records across both digital and physical domains.

In some implementations, the executable code of the control structure can further verify an on-chain condition of the digital twin (e.g., digital-to-physical tracking, such as replicating digital movements of the asset to the physical asset). For example, the on-chain condition can correspond to one or more digital exchanges of the token. That is, a smart contract can be used by the processors to update the physical asset's status based on digital transactions.

In some implementations, digital-to-physical tracking can include the processors receiving exchange data (e.g., transaction details, new ownership information, updated status) of the token. That is, the distributed ledger can communicate with the processors using blockchain protocols, smart contract interfaces, or any secure communication method. In some implementations, the exchange data can correspond to an update in the on-chain condition of the digital twin. The condition can be, but is not limited to, ownership transfer, status change, location update, custodial change, or any significant event. For example, the exchange data can be a new owner address and can indicate a transfer of ownership. In another example, the on-chain condition can be a status change and can indicate that the asset has been marked as verified.

In some implementations, digital-to-physical tracking can include the processors broadcasting the exchange data to the at least one distributed ledger. Similar to above, broadcasting can include the processors submitting the exchange data as a blockchain transaction. However, unlike broadcasting a control structure, tracking data, and/or a token, the exchange data can be broadcast by creating a specific transaction type on the blockchain. For example, broadcasting the exchange data can include generating a fourth record on the at least one distributed ledger for the exchange data and ensuring its verification. In this example, the exchange data can be ownership transfer details and the fourth record can be a blockchain transaction. That is, the fourth record can be generated by encoding the exchange data into a blockchain transaction. That is, the exchange data can be independently verifiable on the at least one distributed ledger such that it can be validated separately. For example, the exchange data can be verified by checking the digital signatures and transaction details.

In some implementations, digital-to-physical tracking can include the processors updating, using the control structure, the tracking device or a connected device communicably coupled to the tracking device based on the exchange data. That is, updating can include generating a command to indicate the update to the actual state of the at least one physical asset and providing the command to the tracking device for presentation or display on the tracking device. For example, the command can be to update the ownership status. In this example, the processors can generate the command by encoding the new owner information. Additionally, the command can cause the tracking device and/or connected device to display the updated status. For example, the command can be a status update and can cause an RFID tag to reflect the new ownership. In some implementations, a display or output device coupled to or encapsulating the physical asset can also be updated such that the new information is shown. For example, the command can cause a display to present the new owner's details.

The implementations described herein have been described with reference to drawings. The drawings illustrate certain details of specific implementations that implement the systems, methods and programs described herein. However, describing the implementations with drawings should not be construed as imposing on the disclosure any limitations that can be present in the drawings.

It should be understood that no claim element herein is to be construed under the provisions of 35 U.S.C. § 112(f), unless the element is expressly recited using the phrase "means for."

As used herein, the term "circuit" can include hardware structured to execute the functions described herein. In some implementations, each respective "circuit" can include software for configuring the hardware to execute the functions described herein. The circuit can be embodied as one or more circuitry components including, but not limited to, processing circuitry, network interfaces, peripheral devices, input devices, output devices, sensors, etc. In some implementations, a circuit can take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" can include any type of component for accomplishing or facilitating achievement of the operations described herein. For example, a circuit as described herein can include one or more transistors, computer-readable medium (CRM), logic gates (e.g., NAND, AND, NOR, OR, XOR, NOT, XNOR), resistors, multiplexers, registers, capacitors, inductors, diodes, wiring, and so on.

Accordingly, the "circuit" can also include one or more processors communicatively coupled to one or more memory or memory devices. In this regard, the one or more processors can execute instructions stored in the memory or can execute instructions otherwise accessible to the one or more processors. In some implementations, the one or more processors can be embodied in various ways. The one or more processors can be constructed in a manner sufficient to perform at least the operations described herein. In some implementations, the one or more processors can be shared by multiple circuits (e.g., circuit A and circuit B can include or otherwise share the same processor which, in some example implementations, can execute instructions stored, or otherwise accessed, via different areas of memory). Alternatively or additionally, the one or more processors can be structured to perform or otherwise execute certain operations independent of one or more co-processors. In other example implementations, two or more processors can be coupled via a bus to enable independent, parallel, pipelined, or multi-threaded instruction execution. Each processor can be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors can take the form of a single core processor, multi-core processor (e.g., a dual core processor, triple core processor, quad core processor), microprocessor, etc. In some implementations, the one or more processors can be external to the apparatus, for example the one or more processors can be a remote processor (e.g., a cloud based processor). Alternatively or additionally, the one or more processors can be internal and/or local to the apparatus. In this regard, a given circuit or components thereof can be disposed locally (e.g., as part of a local server, a local computing system) or remotely (e.g., as part of a remote server such as a cloud based server). To that end, a "circuit" as described herein can include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device can include non-transient volatile storage media, non-volatile storage media, non-transitory storage media (e.g., one or more volatile and/or non-volatile memories), etc. In some implementations, the non-volatile media can take the form of ROM, flash memory (e.g., flash memory such as NAND, 3D NAND, NOR, 3D NOR), EEPROM, MRAM, magnetic storage, hard discs, optical discs, etc. In other implementations, the volatile storage media can take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device can be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, can include any type of input device including, but not limited to, a keyboard, a keypad, a mouse, joystick or other input devices performing a similar function. Comparatively, the term "output device," as described herein, can include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein can show a specific order and composition of method steps, it is understood that the order of these steps can differ from what is depicted. For example, two or more steps can be performed concurrently or with partial concurrence. Also, some method steps that are performed as discrete steps can be combined, steps being performed as a combined step can be separated into discrete steps, the sequence of certain processes can be reversed or otherwise varied, and the nature or number of discrete processes can be altered or varied. The order or sequence of any element or apparatus can be varied or substituted according to alternative implementations. Accordingly, some or all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure can be accomplished with standard programming techniques with rule-based logic and other logic to accomplish the various database searching steps, correlation steps, comparison steps and decision steps.

The foregoing description of implementations has been presented for purposes of illustration and description. It is not intended to be exhaustive or to limit the disclosure to the precise form disclosed, and modifications and variations are possible in light of the above teachings or can be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions can be made in the design, operating conditions and embodiment of the implementations without departing from the scope of the present disclosure as expressed in the appended claims.

What is claimed is:

1. A system for protecting assets, comprising:
- a data processing system comprising one or more processing circuits configured to:
  - identify at least one physical asset corresponding to a tracking device;
  - generate a digital twin of the at least one physical asset, the digital twin comprising a unique identifier, and a metadata object corresponding to the at least one physical asset, wherein the digital twin corresponds to a persistent representation of the at least one physical asset;
  - generate a token comprising a link to the digital twin, the link comprising a reference to a digital twin metadata object that stores state information of the at least one physical asset, wherein the token is linked to a first digital wallet;
  - generate a control structure comprising executable code to verify an off-chain condition of the at least one physical asset, the executable code configured to establish a secure communication link with the tracking device and to receive tracking data from the tracking device via the secure communication link, wherein the off-chain condition corresponds to the tracking data of the tracking device received via the secure communication link using the control structure;
  - broadcast the control structure to at least one distributed ledger, wherein broadcasting comprises generating a first record on the at least one distributed ledger for the control structure, the first record encoding the control structure as executable smart-contract code that is verified by the at least one distributed ledger;
  - receive the tracking data of the tracking device, wherein the tracking data corresponds to an update to metadata of the at least one physical asset;
  - broadcast the tracking data to the at least one distributed ledger; and
  - update, using the control structure, the metadata object comprising the update to the metadata of the digital twin based on the tracking data, wherein updating comprises:
    - accessing, via the link to the digital twin in the token, the metadata object of the digital twin;
    - verifying the update to the metadata based on a digital signature of the tracking data, the digital signature generated by the tracking device using a device-specific private key and verified by the control structure; and
    - verifying that an actual state of the at least one physical asset corresponds to an expected state of the at least one physical asset recorded in the metadata object based on accessing the link to the digital twin in the token, wherein the update of the metadata object is responsive to verifying the actual state corresponds to the expected state.

2. The system of claim 1, wherein the one or more processing circuits are further configured to:
- receive a transfer request comprising information regarding a transfer to a new owner including a current owner digital signature of a current owner of the at least one physical asset and a new owner digital signature of the new owner; and
- in response to receiving the transfer request, transfer, using the control structure, the at least one physical asset to the new owner, the transfer of ownership comprises:
  - updating the metadata object of the digital twin to reflect ownership by the new owner;
  - verifying the current owner digital signature and the new owner digital signature; and
  - recording the transfer on the at least one distributed ledger.

3. The system of claim 2, wherein the transfer of ownership further comprises:
- generating a new token corresponding to the new owner, the new token comprising a link to the updated metadata object, wherein the new token is linked to a second digital wallet of the new owner and the token is marked as inactive or expired.

4. The system of claim 1, wherein the metadata of the metadata object comprises ownership information, custodian information of the at least one physical asset, historical data of the at least one physical asset, the historical data comprising a plurality of previous states and a plurality of previous updates of the metadata object, and wherein the control structure restricts (i) outputs of the metadata object and (ii) updates to the digital twin.

5. The system of claim 1, wherein the one or more processing circuits are further configured to:
- establish the secure communication link with the tracking device by performing a handshake protocol and exchange one or more cryptographic keys to establish the secure communication link for (i) transmitting one or more updates of the digital twin to the tracking device and (ii) receiving the tracking data from the tracking device;
- detect, using the control structure, a discrepancy between either (i) the actual state and the expected state or (ii) an actual location of the at least one physical asset and an expected location of the at least one physical asset based on accessing the link to the metadata object in the token; and
- generate and record an alert on the at least one distributed ledger based on the discrepancy.

6. The system of claim 5, wherein the alert generated by the control structure comprises:
- a timestamp indicating a time of the detected discrepancy;
- the unique identifier of the at least one physical asset;
- the expected state and the actual state of the at least one physical asset; and
- a recommended action for resolving the discrepancy.

7. The system of claim 1, wherein the token further comprises a cryptographic object of the metadata object, the cryptographic object generated using a cryptographic function, and wherein broadcasting comprises propagating the control structure to a plurality of network nodes through a consensus mechanism.

8. The system of claim 7, wherein the one or more processing circuits are further configured to:
re-verify, according to a periodic schedule, the metadata object and the token based on the tracking data, wherein re-verifying comprises:
determining a current cryptographic object of the metadata object; and
validating the current cryptographic object based on the current cryptographic object matching the cryptographic object of the metadata object.

9. The system of claim 7, wherein the one or more processing circuits are further configured to:
re-verify, according to a periodic schedule, the actual state of the at least one physical asset, wherein re-verifying the at least one physical asset comprises:
obtaining updated tracking data from the tracking device; and
verifying the updated tracking data relative to the expected state of the at least one physical asset as recorded in the metadata object.

10. The system of claim 1, wherein the one or more processing circuits are further configured to:
broadcast the token to the at least one distributed ledger, wherein broadcasting comprises generating a second record on the at least one distributed ledger for the token;
wherein the token and the control structure are independently verifiable on the at least one distributed ledger.

11. The system of claim 1, wherein the executable code of the control structure further verifies an on-chain condition of the digital twin, the on-chain condition corresponding to one or more digital exchanges of the token, and wherein the one or more processing circuits are further configured to:
receive exchange data of the token, wherein the exchange data corresponds to an update in the on-chain condition of the digital twin;
broadcast the exchange data to the at least one distributed ledger; and
update, using the control structure, the tracking device or a connected device communicably coupled to the tracking device based on the exchange data, wherein updating comprises:
generating a command to indicate the update to the actual state of the at least one physical asset; and
providing the command to the tracking device for presentation or display on the tracking device.

12. A method, comprising:
identifying, by one or more processing circuits, at least one physical asset corresponding to a tracking device;
generating, by the one or more processing circuits, a digital twin of the at least one physical asset, the digital twin comprising a unique identifier and a metadata object corresponding to the at least one physical asset, wherein the digital twin corresponds to a persistent representation of the at least one physical asset;
generating, by the one or more processing circuits, a token comprising a link to the digital twin, the link comprising a reference to a digital twin metadata object that stores state information of the at least one physical asset, wherein the token is linked to a first digital wallet;
generating, by the one or more processing circuits, a control structure comprising executable code to verify an off-chain condition of the at least one physical asset, the executable code configured to establish a secure communication link with the tracking device and to receive tracking data from the tracking device via the secure communication link, wherein the off-chain condition corresponds to tracking data of the tracking device received via the secure communication link;
broadcasting, by the one or more processing circuits, the control structure to at least one distributed ledger, wherein the broadcasting comprises generating a first record on the at least one distributed ledger for the control structure, the first record encoding the control structure as executable smart-contract code that is verified by the at least one distributed ledger;
receiving, by the one or more processing circuits, the tracking data of the tracking device, wherein the tracking data corresponds to an update to metadata of the at least one physical asset;
broadcasting, by the one or more processing circuits, the tracking data to the at least one distributed ledger; and
updating, by the one or more processing circuits using the control structure, the metadata object comprising the update to the metadata of the digital twin based on the tracking data, wherein updating comprises:
accessing, via the link to the digital twin in the token, the metadata object of the digital twin;
verifying the update to the metadata based on a digital signature of the tracking data, the digital signature generated by the tracking device using a device-specific private key and verified by the control structure; and
verifying that an actual state of the at least one physical asset corresponds to an expected state of the at least one physical asset recorded in the metadata object based on accessing the link to the digital twin in the token, wherein the update of the metadata object is responsive to verifying the actual state corresponds to the expected state.

13. The method of claim 12, further comprising:
receiving, by the one or more processing circuits, a transfer request regarding a transfer to a new owner, the transfer request comprising information regarding a current owner digital signature of a current owner of the at least one physical asset and a new owner digital signature of the new owner; and
in response to receiving the transfer request, transferring, by the one or more processing circuits using the control structure, the at least one physical asset to the new owner, the transfer of ownership comprising:
updating the metadata object of the digital twin to reflect ownership by the new owner;
verifying the current owner digital signature and the new owner digital signature; and
recording the transfer on the at least one distributed ledger.

14. The method of claim 13, wherein the transfer of ownership further comprises:
generating, by the one or more processing circuits, a new token corresponding to the new owner, the new token comprising a link to the updated metadata object, wherein the new token is linked to a second digital wallet of the new owner and the token is marked as inactive or expired.

15. The method of claim 12, wherein the metadata of the metadata object comprises ownership information, custodian information of the at least one physical asset, historical data of the at least one physical asset, the historical data comprising a plurality of previous states and a plurality of previous updates of the metadata object, and wherein the control structure restricts (i) outputs of the metadata object and (ii) updates to the digital twin.

16. The method of claim 12, further comprising:

establishing, by the one or more processing circuits, the secure communication link with the tracking device by performing a handshake protocol and exchange one or more cryptographic keys to establish the secure communication link for (i) transmitting one or more updates of the digital twin to the tracking device and (ii) receiving the tracking data from the tracking device;

detecting, by the one or more processing circuits using the control structure, a discrepancy between either (i) the actual state and the expected state or (ii) an actual location of the at least one physical asset and an expected location of the at least one physical asset based on accessing the link to the metadata object in the token; and generating and recording, by the one or more processing circuits, an alert on the at least one distributed ledger based on the discrepancy.

17. A non-transitory computer readable medium (CRM) comprising one or more instructions stored thereon that, when executed by one or more processing circuits, cause the one or more processing circuits to perform operations comprising:

identifying at least one physical asset corresponding to a tracking device;

generating a digital twin of the at least one physical asset, the digital twin comprising a unique identifier and a metadata object corresponding to the at least one physical asset, wherein the digital twin corresponds to a persistent representation of the at least one physical asset;

generating a token comprising a link to the digital twin, the link comprising a reference to a digital twin metadata object that stores state information of the at least one physical asset, wherein the token is linked to a first digital wallet;

generating a control structure comprising executable code to verify an off-chain condition of the at least one physical asset, the executable code configured to establish a secure communication link with the tracking device and to receive tracking data from the tracking device via the secure communication link, wherein the off-chain condition corresponds to tracking data of the tracking device received via the secure communication link using the control structure;

broadcasting the control structure to at least one distributed ledger, wherein broadcasting comprises generating a first record on the at least one distributed ledger for the control structure, the first record encoding the control structure as executable smart-contract code that is verified by the at least one distributed ledger;

receiving the tracking data of the tracking device, wherein the tracking data corresponds to an update to metadata of the at least one physical asset;

broadcasting the tracking data to the at least one distributed ledger; and updating, using the control structure, the metadata object comprising the update to the metadata of the digital twin based on the tracking data, wherein updating comprises:

accessing, via the link to the digital twin in the token, the metadata object of the digital twin;

verifying the update to the metadata based on a digital signature of the tracking data, the digital signature generated by the tracking device using a device-specific private key and verified by the control structure; and verifying that an actual state of the at least one physical asset corresponds to an expected state of the at least one physical asset recorded in the metadata object based on accessing the link to the digital twin in the token, wherein the update of the metadata object is responsive to verifying the actual state corresponds to the expected state.

18. The non-transitory CRM of claim 17, wherein the one or more instructions, when executed by the one or more processing circuits, further cause the one or more processing circuits to perform operations comprising:

receiving a transfer request regarding a transfer to a new owner, the transfer request comprising information regarding a current owner digital signature of a current owner of the at least one physical asset and a new owner digital signature of the new owner; and in response to receiving the transfer request, transferring, using the control structure, the at least one physical asset to the new owner, the transfer of ownership comprises:

updating the metadata object of the digital twin to reflect ownership by the new owner;

verifying the current owner digital signature and the new owner digital signature; and recording the transfer on the at least one distributed ledger.

19. The non-transitory CRM of claim 18, wherein the transfer of ownership further comprises:

generating a new token corresponding to the new owner, the new token comprising a link to the updated metadata object, wherein the new token is linked to a second digital wallet of the new owner and the token is marked as inactive or expired.

20. The non-transitory CRM of claim 17, wherein the metadata of the metadata object comprises ownership information, custodian information of the at least one physical asset, historical data of the at least one physical asset, the historical data comprising a plurality of previous states and a plurality of previous updates of the metadata object, and wherein the control structure restricts (i) outputs of the metadata object and (ii) updates to the digital twin.

* * * * *